United States Patent
Lazich et al.

(10) Patent No.: US 8,990,276 B2
(45) Date of Patent: Mar. 24, 2015

(54) CIRCUIT AND METHOD FOR GENERATING A TRUE, CIRCUIT-SPECIFIC AND TIME-INVARIANT RANDOM NUMBER

(75) Inventors: Dejan Lazich, Stutensee (DE); Micaela Wuensche, Karlsruhe (DE); Sebastian Kaluza, Munich (DE)

(73) Assignee: Micronas GmbH, Freiburg (DE)

( * ) Notice: Subject to any disclaimer, the term of this patent is extended or adjusted under 35 U.S.C. 154(b) by 1042 days.

(21) Appl. No.: 12/812,361
(22) PCT Filed: Dec. 11, 2008
(86) PCT No.: PCT/EP2008/010520
§ 371 (c)(1),
(2), (4) Date: Oct. 27, 2010
(87) PCT Pub. No.: WO2009/086878
PCT Pub. Date: Jul. 16, 2009

(65) Prior Publication Data
US 2011/0040817 A1  Feb. 17, 2011

(30) Foreign Application Priority Data
Nov. 1, 2008  (DE) .......................... 10 2008 003 946

(51) Int. Cl.
*G06F 1/02* (2006.01)
*G06F 7/58* (2006.01)
(Continued)

(52) U.S. Cl.
CPC .............. *G06F 7/588* (2013.01); *H04L 9/0662* (2013.01); *H04L 9/0637* (2013.01); *H04L 9/0877* (2013.01); *H04L 2209/043* (2013.01)
USPC ................................ 708/250; 708/251; 326/8

(58) Field of Classification Search
USPC .......... 708/250–256; 726/2–6, 17–21, 26–30; 713/189–194; 380/277–286, 44–47; 326/7
See application file for complete search history.

(56) References Cited
U.S. PATENT DOCUMENTS
5,706,218 A * 1/1998 Hoffman ....................... 708/251
5,946,473 A * 8/1999 Lotspiech et al. .............. 703/15
(Continued)

FOREIGN PATENT DOCUMENTS
DE  10 2004 047 425 A1  4/2006

OTHER PUBLICATIONS

G. Edward Suh and Srinivas Devadas, "Physical unclonable functions for device authentication and secret key generation," In Proceedings of the 44th Design Automation Conference, pp. 9-14, 2007.*

(Continued)

*Primary Examiner* — Chat Do
*Assistant Examiner* — Matthew Sandifer
(74) *Attorney, Agent, or Firm* — Muncy, Geissler, Olds & Lowe, P.C.

(57) ABSTRACT

The invention relates to a circuit for generating a true, circuit-specific and time-invariant random binary number, having: a matrix of K–L delay elements that can be connected to each other by means of L–1 single or double commutation circuits into chains of delay elements of length L, a single or double demultiplexer connected before the matrix, a single or double multiplexer connection after the matrix, and a run time or number comparator, wherein the setting of the commutation circuits, the demultiplexer, and the multiplexer can be prescribed by a control signal, wherein the circuit comprises a channel code encoder whereby code words of a channel code can be generated and a transcriber, whereby code words of the channel code can be transcribed into the control signal of the L–1 single or double commutation circuits, and a method for generating a true, circuit-specific and time-invariant random number by means of a matrix of L–K delay elements, L–1 single or double commutation circuits, a single or double demultiplexer connected before the matrix, a single or double multiplexer connection after the matrix, and a run time or number comparator, comprising at least the steps a) generating a code word of a channel code, b) transcribing a code word of a channel code to a selection code, c) generating chains of L delay elements by setting a setting corresponding to the code word of the selection code for the L–1 single or double commutation circuits, the single or double demultiplexer, and the single or double multiplexer, d) pairwise comparing of two variables determined by the delay times of two chains defined by the setting of the L–1 commutation circuits corresponding to the code word of the channel code, by means of a number or delay comparator for generating a bit of the true, circuit-specific and time-invariant random number.

21 Claims, 15 Drawing Sheets

(51) Int. Cl.
*H03K 19/00* (2006.01)
*H04L 9/06* (2006.01)
*H04L 9/08* (2006.01)

(56) References Cited

U.S. PATENT DOCUMENTS

| | | | | |
|---|---|---|---|---|
| 7,840,803 | B2* | 11/2010 | Clarke et al. | 713/168 |
| 8,510,608 | B2* | 8/2013 | Futa et al. | 714/52 |
| 2003/0204743 | A1* | 10/2003 | Devadas et al. | 713/200 |
| 2006/0069706 | A1* | 3/2006 | Lazich et al. | 708/251 |
| 2006/0210082 | A1* | 9/2006 | Devadas et al. | 380/277 |
| 2006/0220753 | A1* | 10/2006 | Boerstler et al. | 331/46 |
| 2009/0083833 | A1* | 3/2009 | Ziola et al. | 726/2 |
| 2009/0106339 | A1* | 4/2009 | Vasyltsov et al. | 708/251 |
| 2009/0254981 | A1* | 10/2009 | Devadas et al. | 726/5 |

OTHER PUBLICATIONS

C. W. O'Donnell, G. E. Suh, and S. Devadas, "PUF-based random number generation," In MIT CSAIL CSG Technical Memo 481, Nov. 2004.*

Futa et al., WO 2008/056612, machine translation, published May 15, 2008.*

Stefan Mangard, Elisabeth Oswald, Thomas Popp: "Power Analysis Attacks—Reveiling the Secrets of Smart Cards", Springer, ISBN 0-387-30857-1, 2007, Chapt. 1, pp. 1-13.

Gassend B et al. "Identification and authentication of integrated circuits" Concurrency and Computation: Practice and Experience, Wiley, London, GB, vol. 3, Jun. 1, 2003, pp. 1-26, XP007908366 ISSN: 1532-0626 Abschnitte 6, 8 Figuren 3, 6, 9, 10, 12.

Suh G E et al. "AEGIS: A single-chip secure processor" Information Security Technical Report, Elsevier Advanced Technology, vol. 10, No. 2, Jan. 1, 2005, pp. 63-73, XP025369326 ISSN: 1363-4127 [retrieved on Jan. 1, 2005] Abschnitt "Physical Random Functions", Seiten 65-68.

Edward Suh G et al. Aegis: A Single-Chip Secure Processor IEEE Design & Test of Computers, IEEE Service Center, New York, NY, US, vol. 24, No. 6, Nov. 1, 2007, pp. 570-580, XP011198556 ISSN:0740-7475 Abschnitt "Physical unclonable functions", Seiten 572-574.

Ghaith Hammouri et al. "PUF-HB: A Tamper-Resilient HB Based Authentication Protocol" Applied Cryptography and Network Security; [Lecture Notes in Computer Science], Springer Berlin Heidelberg, Berlin, Heidelberg, vol. 5037, Jun. 5, 2007, pp. 346-365, XP019076281 ISBN: 978-3-540-68913-3 Section 2, Seite 348-349.

Alkabani Y et al. "Remote activation of ICs for piracy prevention and digital right managment" Computer-Aided Design, 2007. ICCAD 2007. IEEE/ACM International Conference On, IEEE, PI, Nov. 4, 2007, pp. 674-677, XP031221917 ISBN: 978-1-4244-1381-2 Abschnitte III. B und III. C.

Edward Suh G et al. "Physical Unclonable Functions for Device Authentication and Secret Key Generation" Design Automation Conference, 2007. DAC '07. 44TH ACM/IEEE, PI, Jun. 1, 2007, pp. 9-14, XP031183294 ISBN: 978-1-59593-627-1 Abschnitte 1-3.

Joint Interpretation Library: "Integrated Circuit Hardware Evaluation Methodology—Vulnerability Assessment", Version 1.3, IT Secutirty Criteria and Evaluation according to ITSEC, http://www.bsi.de/zertifiz/itkrit/itsec.htm, Apr. 2000.

Sean W. Smith, Steve Weingart: "Building a High-Performance, Programmable Secure Coprocessor", Technical Report, IBM T.J. Watson Research Center, P.O. Box. Yorktown Heights NY 10598, USA, www.research.ibm.com/secure_systems_department/projects/scop/papers/arch.pdf, Revision of Oct. 16, 1998.

Dejan E. Lazic, Vojin Senk: "A Direct Geometrical Method for Bounding the Error Exponent for Any Specific Family of Channel Codes—Part I: Cutoff Rate Lower Bound for Block Codes", *IEEE Transactions on Information Theory*, vol. 38, No. 5, pp. 1548-1559, Sep. 1992.

F. J. MacWilliams and N.J. A. Sloane: "The Theory of Error-Correcting Codes", North-Holland, Amsterdam, ISBN 0-444-85193-3, 1977, Chapter 1, pp. 1-34, Chapter 2, pp. 38-78, Chapter 10, pp. 294-315.

* cited by examiner

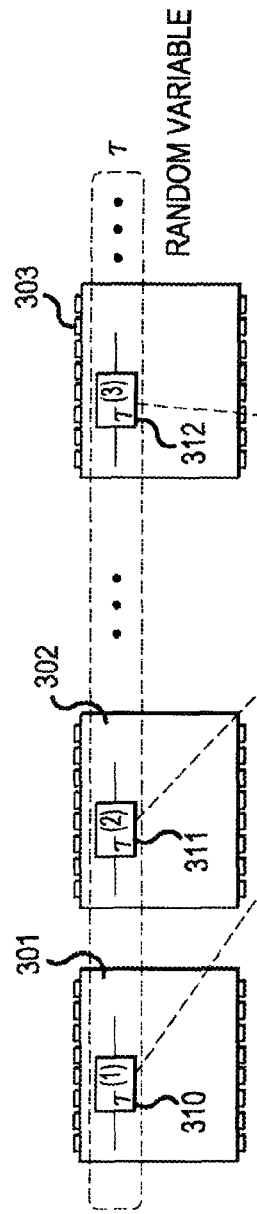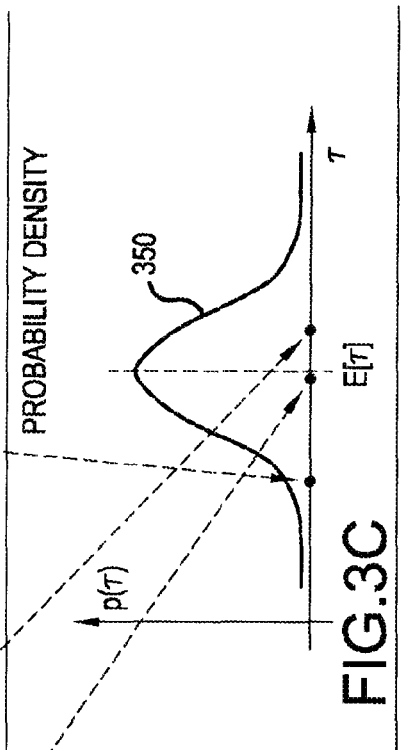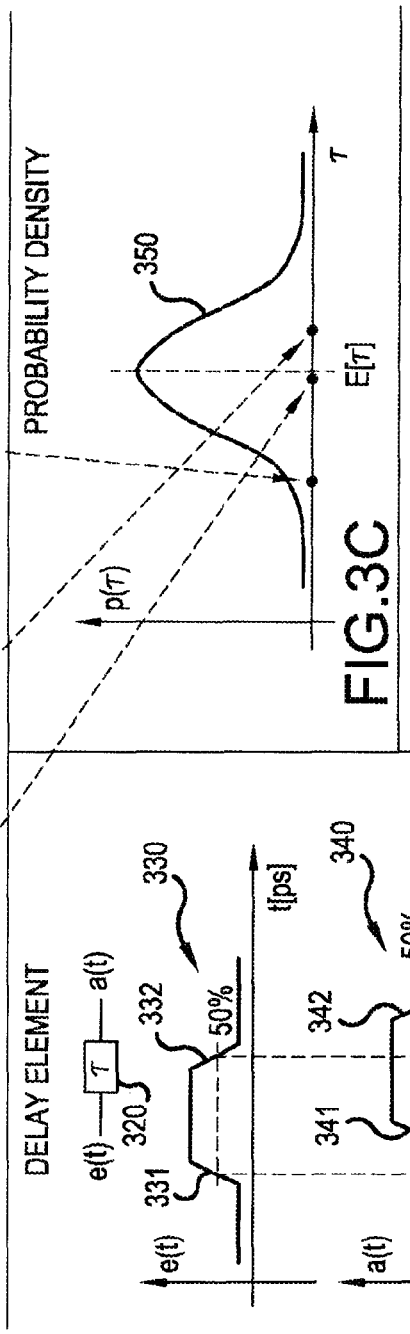

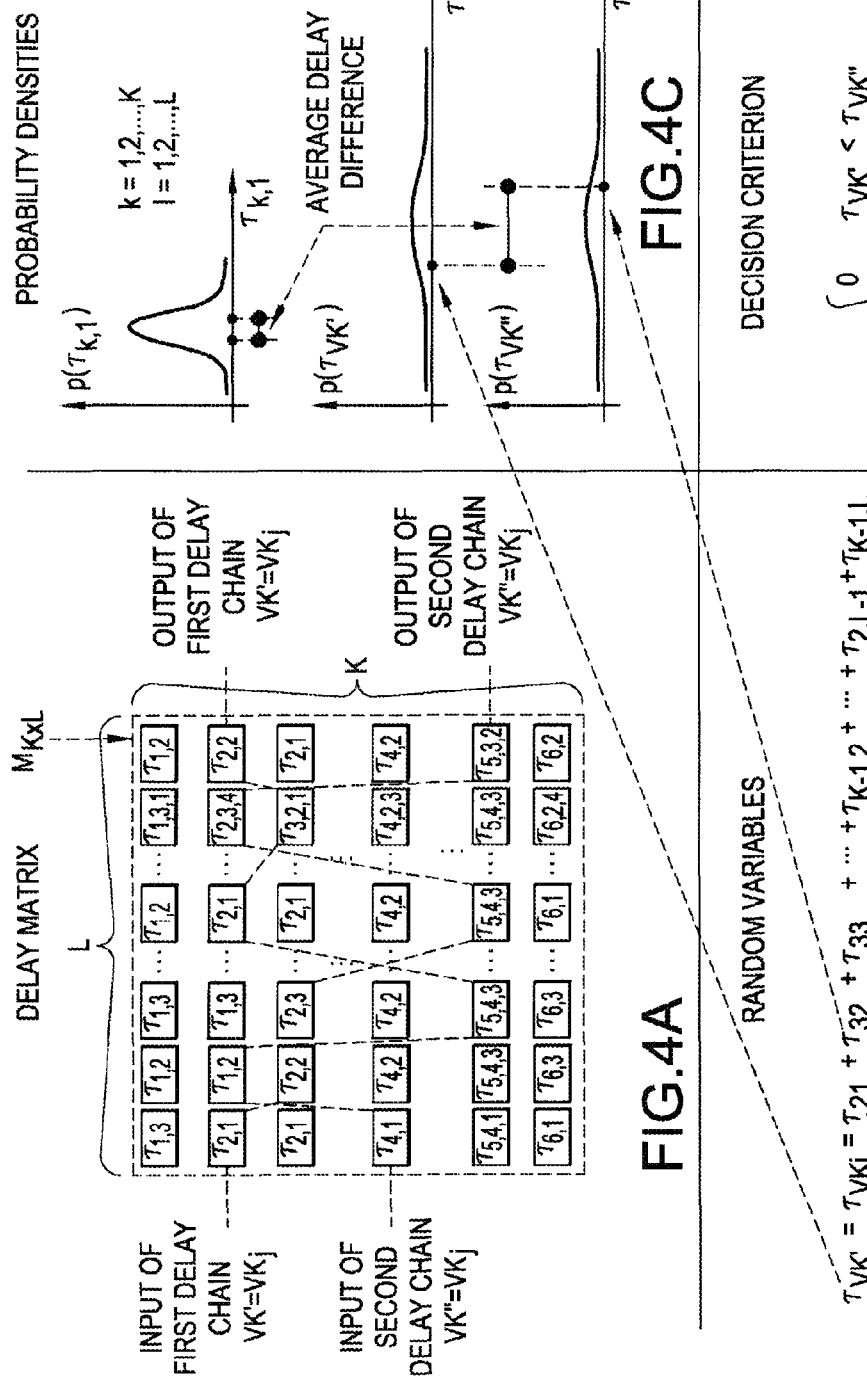

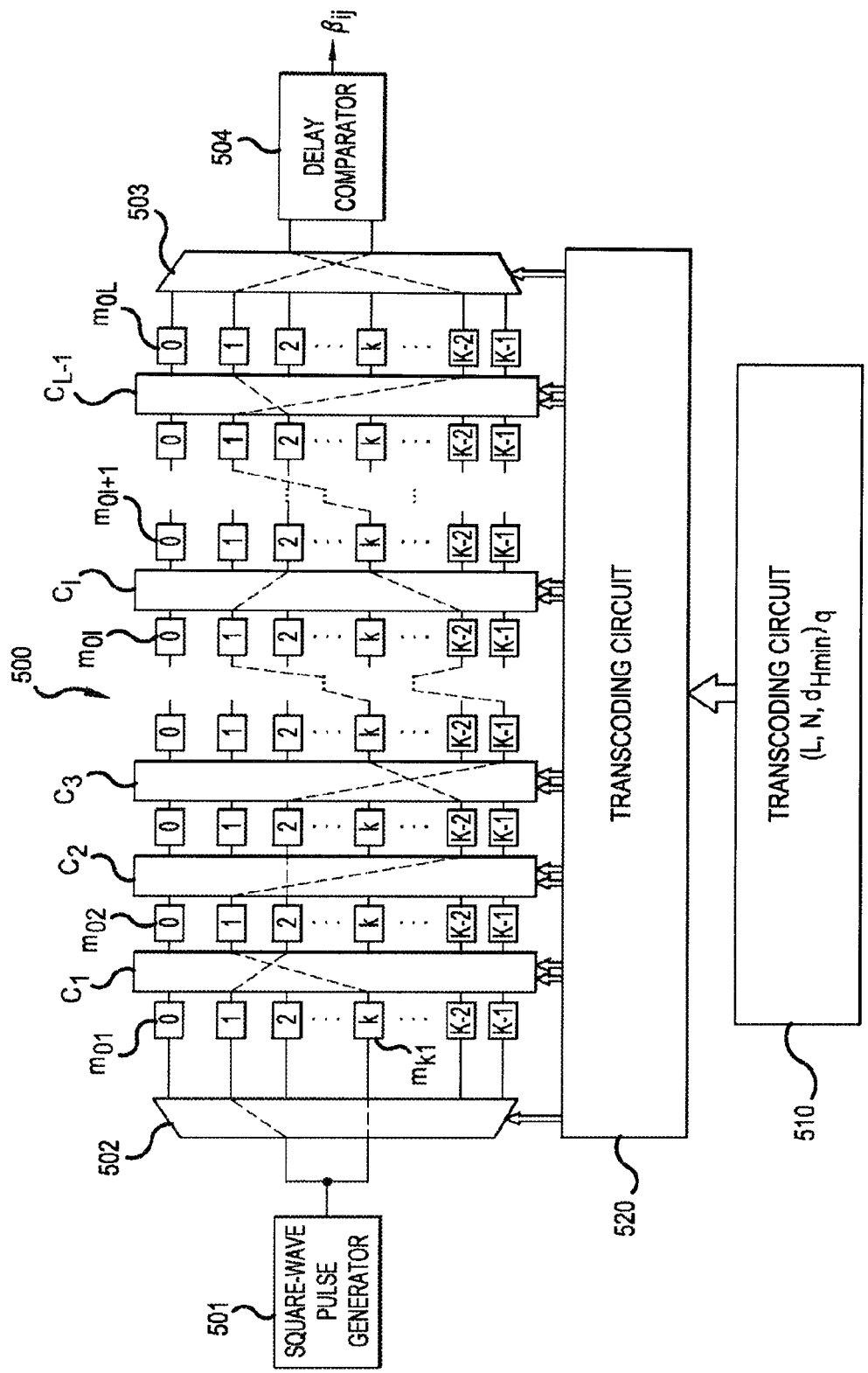

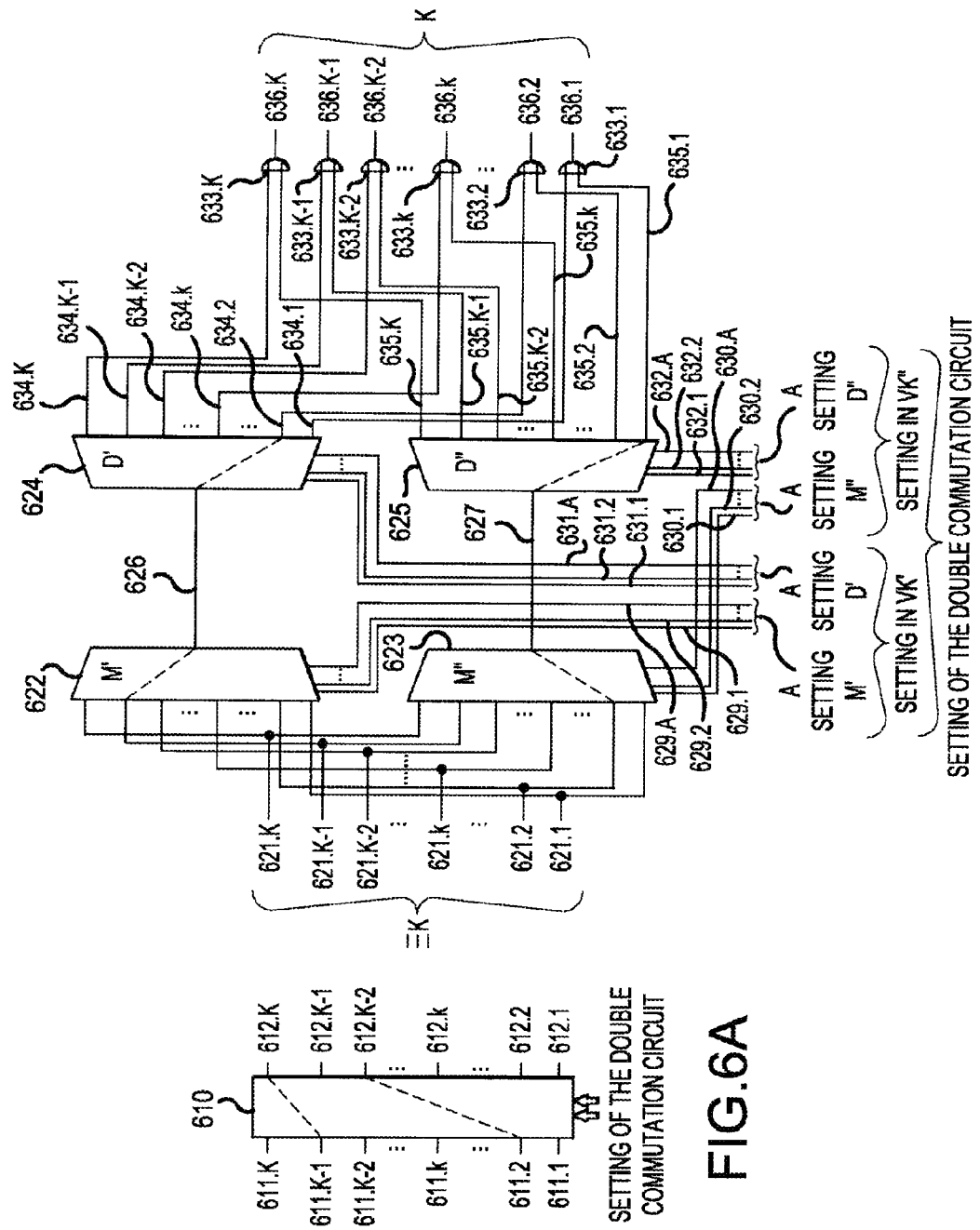

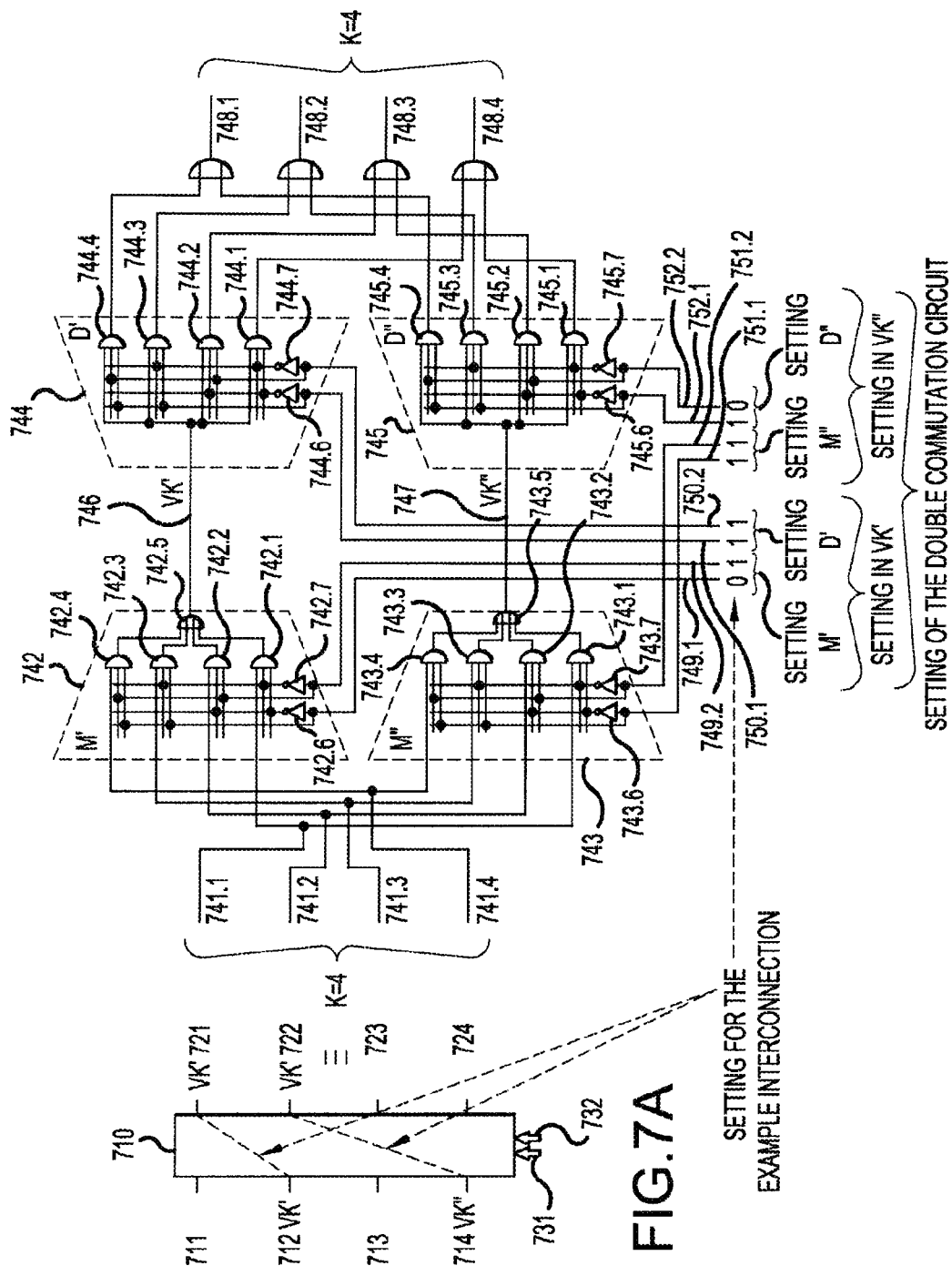

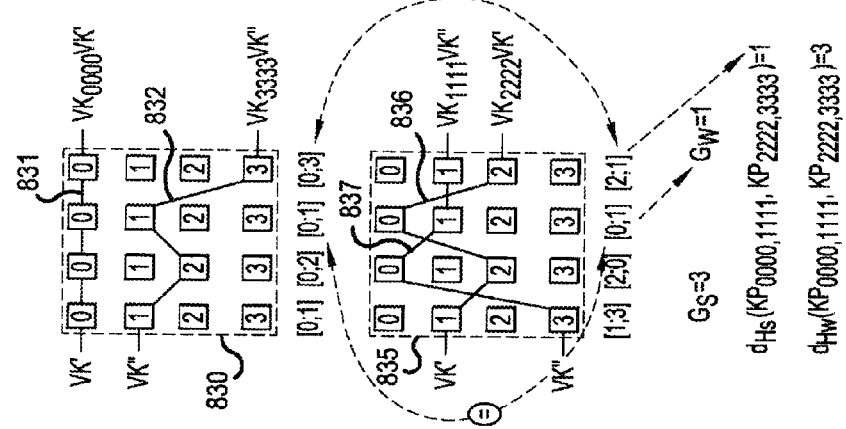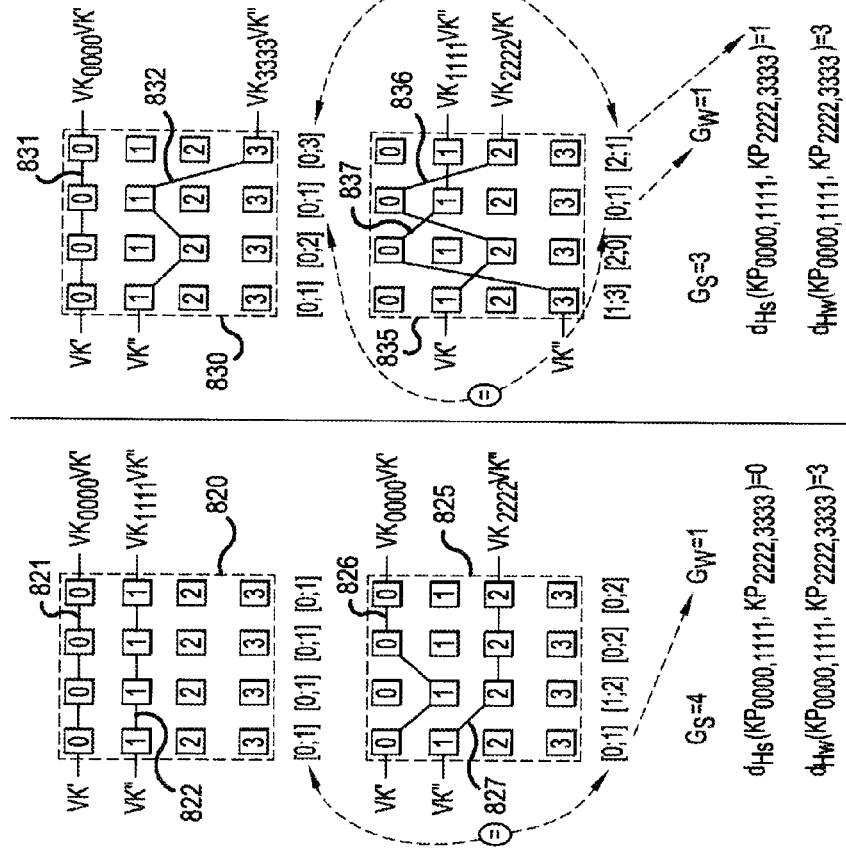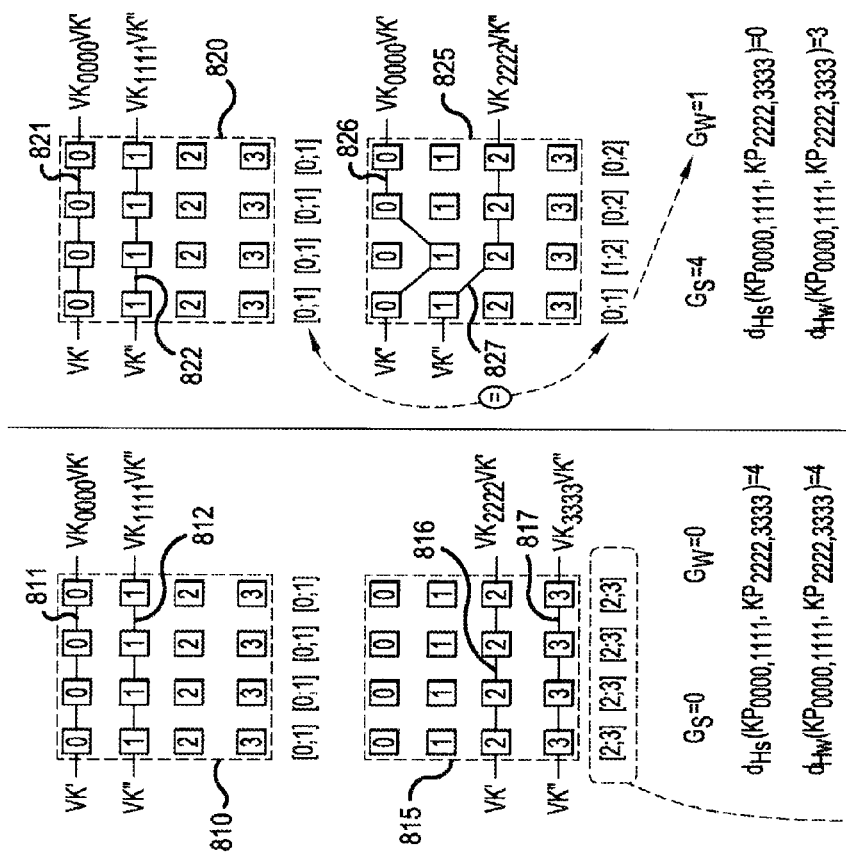

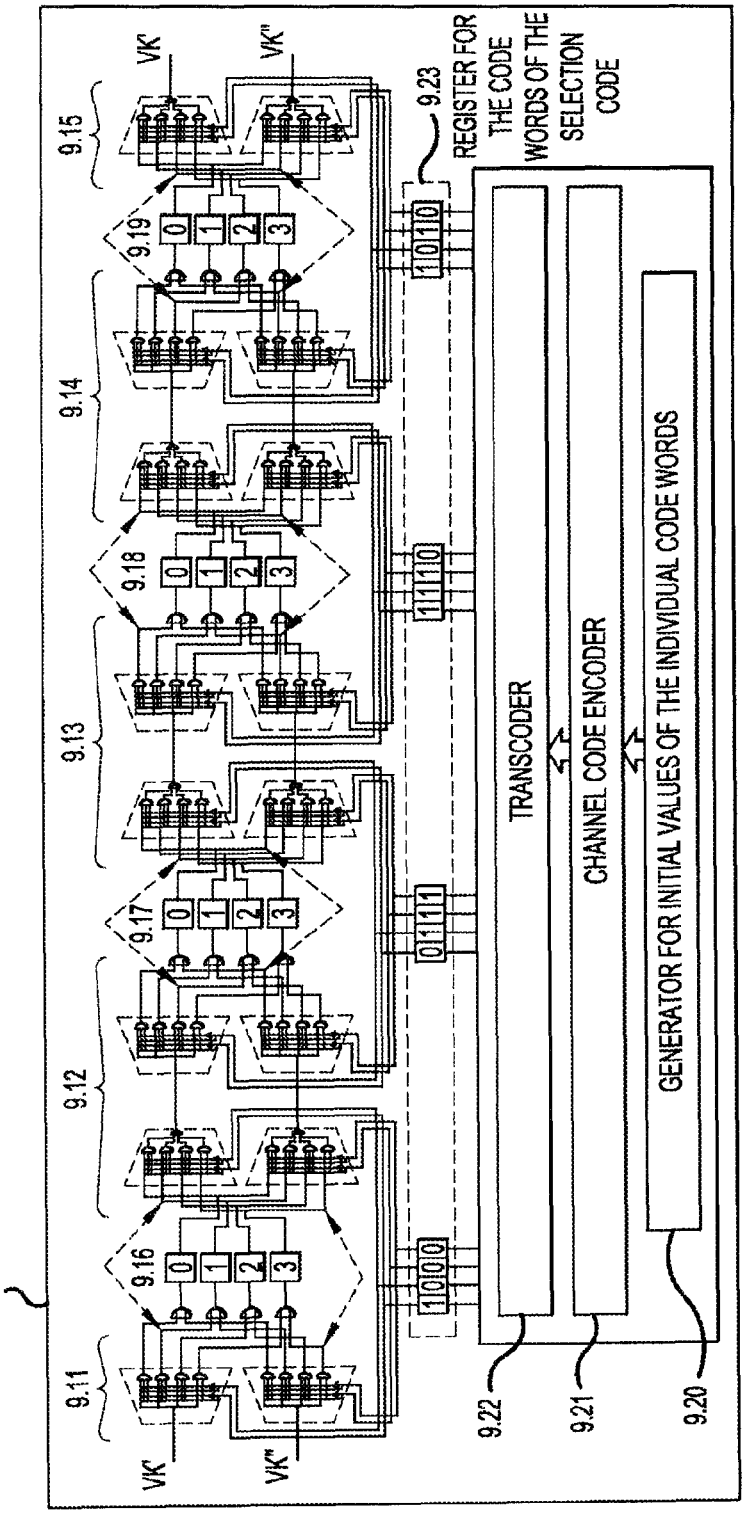

CIRCUIT AND METHOD FOR GENERATING A TRUE, CIRCUIT-SPECIFIC AND TIME-INVARIANT RANDOM NUMBER

An integrated circuit (IC) which is provided for performing cryptographic methods should have the option of preserving its private key (for asymmetrical cryptoalgorithms) as well as all secret keys (for symmetrical cryptoalgorithms), which it has exchanged with its communication partners (other ICs), in a secure manner (in the sense of secrecy) in nonvolatile memories provided for this purpose.

Often other data needed by an IC for its intended cryptographic functions should also be kept secret—for example, secret keys for encrypting and decrypting sensitive data to be stored in an unsecured memory, initial values (English: initial values) for a cryptographic mode or for a pseudorandom number generator, passwords for access to certain IC regions, etc.

In the remaining course of this document, all secret data used constantly or occasionally by an IC for satisfactory functioning are referred to as secret IC data. Some types of secret IC data must be supplied to the IC from the outside in the so-called personalization phase during its production. Other types of secret IC data may be determined by the IC itself during its regular use (operating phase) or in cooperation with other ICs during various cryptoprotocols for exchange of secrets. As soon as secret IC data are generated, they should be stored in a nonvolatile memory to be ready for use immediately as needed for certain tasks within the IC.

The data should be protected at all times against all possible types of implementation attacks, both when the IC is running and when the IC is off (when the power supply is interrupted). Implementation attacks are understood to be unauthorized manipulations (attacks) which utilize weaknesses in the physical implementation of cryptosystems in an IC [1, 2, 3].

Secure storage of secret IC data (English: data storage cell security mechanism [4]) is understood to refer only to effective protection against implementation attacks on secret IC data, which are present in unencrypted form (in plain text) within the nonvolatile memory. Effective protection during generation, input into and readout from the nonvolatile memory as well as during the use of the secret IC data in the cryptoalgorithm currently being executed, must be considered separately and is referred to as secure processing of secret IC data.

Secure storage and secure processing of secret IC data may be ensured by using certain measures against implementation attacks [2, 5]. Either the entire IC or only the portion of the IC in which the secret IC data are stored and processed is protected by suitable countermeasures. This protected portion of the IC is referred to as the protected IC region (English: physical security boundary). Measures against static implementation attacks (when the IC is off) on secure storage of secret IC data are much more complex and difficult to implement than measures against dynamic implementation attacks (when the IC is running) on secure processing of secret IC data. This is due mainly to the fact that the attack when the IC is off is not subject to any restrictions with regard to time or program sequence. The protected IC region must therefore be shielded and monitored constantly by various sensors (even when the IC is off) [5].

Another possibility, in addition to secure storage, may also be used to protect saved secret IC data, so that only protective measures against dynamic implementation attacks on the processing of secret IC data are necessary. For this purpose, one may encrypt all secret IC data symmetrically by using a special secret key, which the IC itself has generated and which must not be known to anyone else, and then to store this key in a nonvolatile memory, which is not protected separately. This memory need not be in the protected IC region, it may even be outside of the IC. The special secret key used for this purpose must be a true binary time-invariant random number which is referred to in this document as an individual IC key. This random number, i.e., this individual IC key must not be generated by a deterministic algorithm and must be stored in a particularly secure, nonvolatile manner because the security of all secret IC data depends on this. The generation, storage, and processing of the individual IC key must therefore resist all known implementation attacks, if possible.

For the implementation of these properties, the standard methods for generation and nonvolatile storage of cryptographic keys in an IC are not sufficient. Special physical properties and technical mechanisms must be used to preserve the individual IC key in a nondigital form in a nonvolatile manner in the IC, i.e., the individual IC key must always be camouflaged in the IC. It should be extracted (converted to digital form) from this camouflaged (unrecognizable) nondigital form only by a suitable extraction circuit as needed. This digital form should be deleted again immediately after the shortest possible use. Only the original, camouflaged, nondigital form may be stored continuously in the IC for the next generation of the digital form of the individual IC key.

In contrast with secure storage of secret IC data in plain text, the encryption of secret IC data using the individual IC key requires more data processing, e.g., extraction of the individual IC key into digital form, generation of a hash value for an integrity check and encryption, and decryption of the secret IC data. On the other hand, it is much simpler in this case to use measures against implementation attacks because this requires only protective measures against implementation attacks on the processing of secret IC data.

This relates in particular to embedded systems, which use increasing volumes of secret IC data because of the increasing networking. These systems are exposed to these attacks with a particularly high frequency and are also very cost sensitive.

FIG. 1, which is explained in detail below, shows the design of these two fundamentally different methods for protection of secret IC data: FIG. 1a) shows the traditional strategy of secure storage by shielding and monitoring of the secret IC data in plain text, and FIG. 1b) shows the strategy of encryption of secret IC data using a manipulation-proof and camouflaged individual IC key, such as that considered in this document.

An individual IC key must necessarily have a number of properties:

Each individual IC from an IC production series of M functionally identically ICs having cryptographic functions, manufactured using the same lithographic masks, should, after the initial retrieval of an initialization command, generate a binary number of length N, which is unique for this specific IC and is unpredictable (random) before the first retrieval of this initialization command. Each renewed retrieval of this initialization command in the same IC should again generate the same number, even if the power supply of the IC has been interrupted in the meantime (the IC was off). This number, which represents the individual IC key, is used exclusively for the protection (secrecy) of all secret IC data and as a source for generation of secure identification data of this IC, exclusively within the IC having generated it.

The individual IC key should fulfill the following properties in particular:
1. Secrecy—During as well as before and after the entire lifecycle of the IC, the individual IC key must not be known to anyone or reproduced at another location not intended for this purpose without requiring an effort which would far exceed the benefit of this compromising.

2. Protection from serial compromising—Knowledge of any number of individual IC keys of an IC production series, which are learned by possibly successful attacks, must not facilitate the compromise of additional as yet unknown individual IC keys to such an extent that the costs no longer far exceed the benefits.

3. Integrity protection—The generated value of the individual IC key must not be influenceable and thus be modifiable via the inputs and outputs of the IC or by any other method. This value may be generated exclusively by an individual IC key generator placed in a certain protected IC region.

4. Time and place restriction—The individual IC key must never leave the protected IC region or be stored in a nonvolatile form (in digital form). It may be made available only to circuits for symmetrical encryption and decryption of secret IC data. The volatile storage required for this is allowed only for a short period of time, preferably only bit-by-bit or in portions. After use in the encryption or decryption process, its digital value is deleted immediately. After the decryption process, the decrypted secret IC data are made available to the proper users of secret IC data (that execute the cryptoalgorithms) and are deleted immediately after use.

5. Resistance to implementation attacks—The protected IC region and thus the individual IC key generator itself should be protected against as many types of implementation attacks on secure processing of secret IC data as possible. No special measures need be taken against implementation attacks on secure storage (in plain text) because all these data are stored in encrypted form using the individual IC key.

6. Avoiding obfuscation—To protect against attacks by reverse engineering, the individual IC key generator must not function on the basis of a concealed or known deterministic algorithm, which is parameterized using concealed parameters. It must not be parameterized individually during or after IC production, even if this is done confidentially and the parameters are integrated into the IC in concealed form. The cryptographic principle offered by obfuscation should be maintained.

7. Nondeterministic generation—The individual IC key generator must thus function on the basis of a nondeterministic method. The individual bit values of the individual IC key should be determined by a true time-invariant, value-continuous random source within the IC.

8. Unclonability—The value-continuous, time-invariant random source should be interpreted as the correct value of the individual IC key only by an extraction circuit inseparably integrated with it and only after an initialization command. This binary value must not be reconstructable with any other means or methods from the value-continuous random source and thus be compromisable.

9. Reliable extraction—The probability of an erroneous interpretation during extraction of the individual IC key by the extraction circuit itself, which may occur due to various measurement disturbances, should be as small as possible. This extraction error probability should also be influenced as little as possible by changes in ambient conditions. It may be reduced somewhat by using error-correcting code. To ensure error-free extraction, a cryptographic hash value may be generated by the individual IC key in the personalization phase and stored in a nonvolatile memory.

10. Large Hamming distance—The smallest Hamming distance $d_{Hm}$ occurring between any two individual IC keys should be as large as possible to keep the complete search (English: brute force) for other individual IC keys as complex as possible after a compromise. In addition, the individual IC keys of one IC production series must be long enough (large enough N) to keep the value of this minimal Hamming distance high enough. This requirement is optimally met when all M individual IC keys of one IC production series, interpreted as bit sequences, meet the criteria of a true random bit sequence. Expressed in terms of information theory, all individual IC keys of one IC production series should have a binary random block code (N, M, $d_{Hm})_2$ in the sense of Shannon [6], which should be a very small code rate R=($\log_2$ M)/N [7, 8, 9].

FIG. 2, which is explained in detail further below, shows the basic design of an individual IC key generator.

The present document presents an invention which enables protection of secret IC data and an IC identity check with the aid of an individual IC key having properties postulated above.

It is known that gate transit time τ of functionally identical logic gates, for example, AND circuits, OR circuits, inverters (NOR circuits), or pure delay elements in an IC is randomly varied from one IC to the next IC, even in manufacturing the same specific embodiments using the same technology and lithographic masks (see FIG. 3a). Furthermore, there is an additional influence of the particular ambient conditions—for example, temperature, power supply voltage, and aging—on the absolute transit times of the particular gates, but hardly on the ratio of the gate transit times of different gates of one IC to one another. Accordingly, it is self-evident to use the gate transit time (see definition in FIG. 3b) of such a delay element as a value-continuous random variable T to generate an individual IC key. FIG. 3c shows a typical curve of the probability density of this random variable.

However, only binary individual IC keys may be used in the practical application, which is why a transformation of the value-continuous random variable into a value-discrete, binary, uniformly distributed random variable β is necessary. This is possible, for example, by introducing the expected value E[T] as a threshold value. If the effective value of the continuous random variable is below this threshold value, the binary random variable is assigned a value of 0; otherwise, the value 1 is assigned, as shown in FIG. 3d.

However, three essential implementation problems occur with this transformation, in particular when using one individual delay element per IC to generate a binary random variable: first, only one binary one-bit-wide random number may be generated using a threshold value; second, sufficiently precise estimation and implementation of the threshold value are difficult; third, the differences between the measured value and the threshold value are very small, so that measurement disturbances often prevent an unambiguous determination of the binary value and therefore increase the extraction error probability (see property 9 above: reliable extraction).

These problems are solved by a circuit having the features of claim 1 and a method having the features of claim 12.

The present invention is based on the finding that when using a matrix of delay elements, which are variably interconnectable to form chains of delay elements, a plurality of binary random variables may be provided through the variable interconnection, by comparing the delay times of two such chains with one another. The implementation of a threshold value is thus easily prevented. The difference in the delay times of two chains of delay elements is then used instead of the differences between the measured value and the threshold value, this difference being increased significantly in comparison with the variation in the delay times of two individual delay elements precisely when the chains of delay elements differ sufficiently from one another.

Accordingly, the circuit according to the present invention for generating a true, circuit-specific, time-invariant, binary random number has at least one matrix of K·L delay elements which are interconnectable via L−1 single or double commutation circuits to form chains of delay elements of length L, a single or double demultiplexer connected upstream from the matrix and a single or double multiplexer connected downstream from the matrix, and a transit time comparator or numeric comparator, such that the setting of the commutation circuits, of the demultiplexer and of the multiplexer is predefinable by a control signal. According to the present invention, the circuit also has a channel code encoder with which the code words of a channel code are generable, and a transcoder, with which code words of the channel code are transcodable to the control signal of the L−1 single or double commutation circuits.

A channel code is a block code having $N<q^L$ code words, made up of q possible code symbols, and has a certain minimal Hamming distance $d_{Hm}>1$ between its code words of length L. The greater $d_{Hm}$, the better the channel code, assuming that pairs of code words for a given N, L, and q are compared.

According to the present invention, the individual code words of the channel code control the setting of the commutation circuits, the demultiplexer and the multiplexer through a corresponding transcoding by a transcoder, which converts the code word of the channel code into a code word of a selection code, this setting being possible in particular via the corresponding control buses, i.e., on the one hand controlling which delay elements from neighboring columns of the matrix of delay elements are interconnected, into which delay element(s) of the first column of the matrix a signal is to be fed for the transit time determination and at which delay element(s) of the last column of the matrix the signal is to be picked up for the transit time determination.

The channel code encoder and the corresponding transcoder determine the selection code for the chain pairs. Providing this encoder ensures that such chain pairs, which are as dissimilar from one another as possible, are compared with one another by the transit time comparator or numeric comparator.

The advantages of this configuration include the fact that a plurality of binary random variables may be made available by the variable connection, and the implementation of a threshold value is replaced in a simple and stable manner with comparison of the variables depending on the delay times of two such chains with one another. The difference in delay times of two chains of delay elements or a variable depending on this difference, e.g., the number of possible runs in a given time through the particular feedback chains of delay elements replaces the differences between the measured value and the threshold value. The stability of these variables is definitely increased in comparison with the variation in the delay times of two individual delay elements. The individual IC key may then be generated bit-by-bit from the corresponding binary random variables, which significantly reduces the extraction error probability in contrast with a procedure in which a complete individual IC key is generated immediately, and which makes it unnecessary to provide additional error-correcting codes (see property 9 above).

In a particularly preferred specific embodiment, the delay elements are inverters. Furthermore, the first chain of L delay elements is preferably also fed back to its input to form a first ring oscillator, and the output of the second chain of L delay elements is fed back to its input to form a second ring oscillator, either chain length L being even or chain length L being uneven, and the feedback occurs via an additional inverter.

The use of a device having the resulting ring oscillators brings the great advantage that the transit time differences, which are still relatively small, even with chains of delay elements, are added up. To monitor the ring oscillators, it is also advantageous if a first counter and a second counter are provided, the first counter being in signal connection with the first ring oscillator and the first input of the comparator, and the second counter being in signal connection with the second ring oscillator and the second input of the comparator, so that the delays of the first ring oscillator and of the second ring oscillator, which have accumulated over a predetermined number of feedback cycles, are forwarded to the particular inputs for the comparator.

Experiments have revealed that it is appropriate if at least one of the chains has at its beginning or end at least one additional delay element not belonging to the matrix of L·K delay elements, this delay element being connected directly to the adjacent delay elements of the chain, not via a double commutation circuit, and both chains having different numbers of delay elements because the occurrence of cross-coupling effects in the vibration behavior of the first and second ring oscillators may be prevented in this way. A suitably adjusted correction must then be performed in order for the comparison of delay times not to be impaired.

A specific embodiment in which a generator for initial values of the channel code encoder is provided is particularly preferred, so that generation of the code words of the channel code is initiated. This may be accomplished by using a simple counter, but it may be easier with regard to the circuit technology to use a lookup table in which the initial values may be looked up as the generator for the initial values.

In the case when K>2, a channel code encoder, which generates the code words according to a Reed-Solomon channel code, has proven suitable for generating code words.

In one embodiment of the present invention which is particularly simple in terms of circuit technology, K=2, so that single multiplexers may be used as double commutation circuits. It is also advantageous to select L so that it may be represented as $2^l-1$ using a natural number $l \neq 0$. The choice of L and l evidently also has a significant influence on how many bits the individual IC key may include at the maximum, as explained in greater detail below, because it determines the maximum number of different chains of delay elements at a given K.

A simplified embodiment of the channel code encoder is possible in the case when K=2, in which a simplex channel code may be used instead of the Reed-Solomon channel code. In this case, a feedback shift register having $L=2^l-1$ shifts and $L+1=2^l$ initial values, whose feedbacks are determined by a primitive polynomial, is available as an embodiment of the channel code encoder to be preferred for reasons of circuit technology.

In a particularly simple embodiment of the present invention, the channel code encoder may be embodied as a lookup table or a channel code encoder, and the transcoder may be embodied as a lookup table.

The method according to the present invention for generating a true, circuit-specific, time-invariant random number by using a matrix of L·K delay elements, L−1 single or double commutation circuits, a single or double demultiplexer upstream from the matrix, a single or double multiplexer downstream from the matrix and a transit time comparator or numeric comparator includes at least the steps of generating a code word of a channel code, transcoding a code word of a channel code to a selection code, generating chains of L delay elements by setting a setting of the L−1 single or double commutation circuits corresponding to one of the code words of the selection code, the single or double demultiplexer and the single or double multiplexer and paired comparison of quantities determined by the delay times of two chains of L delay elements defined by the setting of the L−1 commutation circuits corresponding to the code word of the channel code, for generation of one bit of the true, circuit-specific, time-invariant random number.

For each bit of the individual IC key, one code word of the channel code may be generated, transcoded, and used for assembly into the corresponding chains of L delay elements, but the code words of the channel code and/or the code words of the selection code may also be generated in advance and stored in a lookup table, for example.

The advantages of this method include the fact that through the variable interconnection, a plurality of binary random variables may be made available, and the implementation of the threshold value is avoided in a simple and stable manner by comparing the delay times of two such chains. The difference in the delay times of two chains of delay elements, which is greatly increased in comparison with the variation of the delay times of two individual delay elements, is then used instead of the differences between the measured value and the threshold value. The individual IC key may then be generated bit-by-bit from the corresponding binary random variables, which significantly reduces the extraction error probability in contrast with a procedure in which a complete individual IC key is generated immediately, and makes it unnecessary to provide additional error-correcting codes (see property 9 above).

It has proven to be particularly advantageous if the quantities determined by the delay times of two chains of L delay elements defined by the setting of the L−1 double commutation circuits, these quantities being compared by the comparator, are generated by operation of the chains as ring oscillators over a predefined number of oscillations. The difference between the transit times is definitely increased by the resulting repeated run-through of the corresponding chains of delay elements, thereby achieving an improved stability (lower extraction error probability) of the determination of the bit of the individual IC key just ascertained. One may also of course (conversely) determine these bits by comparing the counted oscillations in a predefined time interval.

A procedure in which the two chains of L delay elements are each operated individually is particularly stable in comparison with a mutual influence on the chains to be compared.

A time-saving procedure for avoiding a mutual influence on the chains to be compared involves operating the first chain of L delay elements and the second chain of L delay elements as ring oscillators at the same time, but a defined time offset which increases with each oscillation is generated between the chains by an unequal number of added further delay elements not belonging to the L·K matrix of delay elements. In this case, in order not to falsify the probability distribution of the bits of the individual IC key determined by the comparator, the counter readings are advantageously corrected by the defined offset before the comparison.

Transcoding is possible in a particularly elegant manner in the case when K=2 according to the XOR rule discussed in detail below.

It is particularly advantageous if the first chain of L delay elements and the second chain of L delay elements are fed back to their particular inputs with the aid of a parity check circuit.

To generate the code words of the selection code, the Reed-Solomon code has proven to be a simple method when K>2. However, specifically in the case when K=2, an advantageous alternative is to be seen in generating the selection codes according to a simplex code. The simplest technical implementation of this is achieved when the code words are generated by a feedback shift register having $L=2^{L-1}$ shifts and L+1 initial values, whose feedbacks are determined by a primitive polynomial.

The present invention is explained in greater detail below on the basis of exemplary embodiments depicted in the drawings.

FIG. 3a shows a series of IC modules having delay elements;

FIG. 3b shows a graphic diagram of gate transit time τ of a delay element;

FIG. 3c shows an example of a probability density of the signal transit times of delay elements;

FIG. 3d shows a criterion for transformation of a value-continuous random variable T to a value-discrete, binary, uniformly distributed random variable β;

FIG. 4a shows a matrix $M_{K \times L}$ of delay elements $\tau_{kl}$;

FIG. 4b shows an allocation of two value-continuous random variables $T_{VK'}$ and $T_{VK''}$ to two delay chains;

FIG. 4c shows a comparison of the probability densities of the transit time distribution of individual delay elements having probability densities of the transit time of chains of delay elements;

FIG. 4d shows a decision criterion usable within the scope of the present invention for obtaining a value-discrete binary random variable $\beta_{ij}$;

FIG. 5 shows a circuit configuration according to a first specific embodiment of the present invention;

FIG. 6a shows a schematic diagram of a double commutation circuit;

FIG. 6b shows the general design of a double commutation circuit;

FIG. 7a shows an exemplary embodiment setting of a double commutation circuit for K=4;

FIG. 7b shows the detailed design of a double commutation circuit for K=4;

FIG. 8a shows a first connection of a 4×4 matrix of delay elements to chains of length 4 and the resulting Hamming distances;

FIG. 8b shows a second connection of a 4×4 matrix of delay elements to chains of length 4 and the resulting Hamming distances;

FIG. 8c shows a third connection of a 4×4 matrix of delay elements to chains of length 4 and the resulting Hamming distances;

FIG. 9a shows an example of a simple nonlinear channel code having the parameters $(L=4, N=6, d_{Hm}=3)_{q=6}$;

FIG. 9b shows an example of the construction of a connectable delay matrix controlled using the channel code in FIG. 9a;

FIG. 12b shows a shorthand notation for the circuit according to FIG. 12a;

FIG. 13b shows all 16 pairs of delay chains, which may be formed using the configuration from FIG. 13a;

Figure 1:
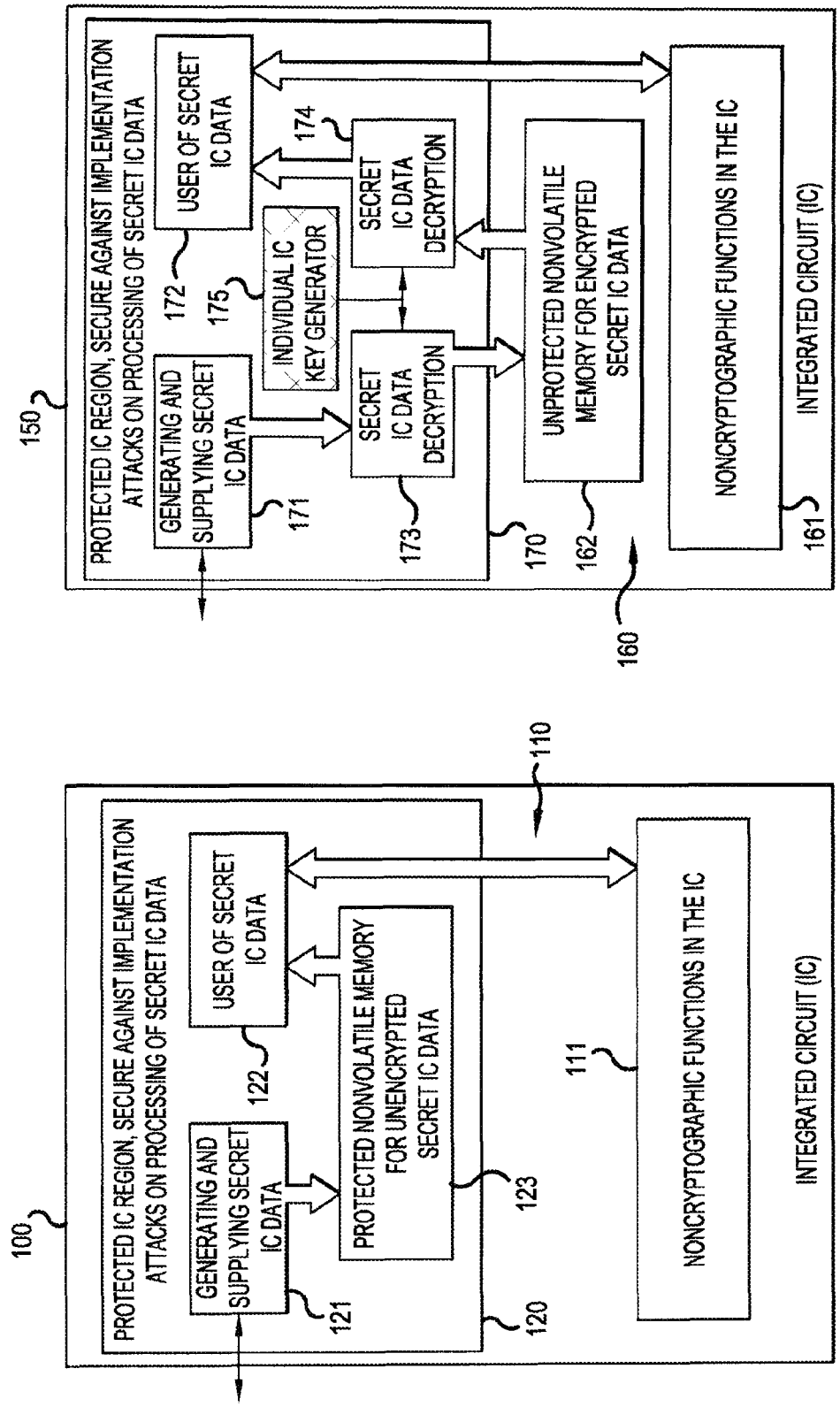
FIG. 1a shows a basic schematic diagram of a protected integrated circuit for a strategy of shielding and monitoring secret IC data.
FIG. 1b shows a basic schematic diagram of a protected integrated circuit for a strategy for encryption of the secret IC data and camouflaging the individual IC key.

Secure storage and secure processing of secret IC data may be ensured by using known measures against implementation attacks. FIG. 1a schematically shows an integrated circuit 100 including an unprotected IC region 110 and an IC region 120, which is protected against implementation attacks, as an example of an IC architecture directed at shielding and monitoring the secret IC data. Noncryptographic functions 111 of the IC are located in unprotected IC region 110, whereas processing of secret IC data, the generation and supply of secret IC data 121 and the use of secret IC data 122 take place concretely in protected IC region 120. In addition, a particularly protected (shielded and monitored), nonvolatile memory 123 for unencrypted secret IC data is located in protected IC region 120. However, this memory is exposed to static implementation attacks (with the IC off) against which security measures are much more complex and more difficult to implement than the measures against dynamic implementation attacks (with the IC running) on the secure processing of secret IC data. This is due mainly to the fact that the attack when the IC is off is not subject to any restrictions with regard to time or program sequence. Therefore, protected IC region 120 (or possibly only 123) must be shielded and monitored constantly (even when the IC is off) by various sensors.

FIG. 1b schematically shows an integrated circuit 150, which also has an unprotected IC region 160 and an IC region 170, protected against implementation attacks as an example of an IC architecture directed at camouflaging the individual IC key and encryption of the secret IC data. The essential difference in comparison with FIG. 1a is that now not only noncryptographic functions 161 of the IC but also an unprotected nonvolatile memory 162 for encrypted secret IC data are present in the unprotected region. Only the processing of the secret data, which in this case also includes a secret IC data encryption 173 and a secret IC data decryption 174 in addition to generation and supply of secret IC data 171 and use of secret IC data 172, take place in protected region 170. Secret IC data encryption 173 and secret IC data decryption 174 take place here using the individual IC key generated by an individual IC key generator 175. Protective measures against dynamic implementation attacks on the processing of secret IC data are thus necessary only in protected region 170. The secret IC data are also secure in unprotected nonvolatile memory 162 because they are symmetrically encrypted via a specially camouflaged individual IC key generated by the IC itself and not known to anyone else. This memory 162 may even be located outside of the IC.

The individual IC key used for this purpose must not be generated by a deterministic algorithm and must be stored in a particularly secure (camouflaged) manner because the security of all the secret IC data depends on this key. Therefore, the generation, storage, and processing of the individual IC key must resist all known implementation attacks.

For implementation of these properties, the standard methods of generation and nonvolatile storage of keys in an IC are not sufficient. Special physical properties and technical measures must be used to preserve the individual IC key in a nondigital form in a nonvolatile manner in the IC, these properties and mechanisms being implementable on the basis of the detailed schematic diagram of a protected integrated circuit for a strategy of camouflaging the individual IC key and encryption of the secret IC data in FIG. 2, as pursued in the present invention.

Figure 2:
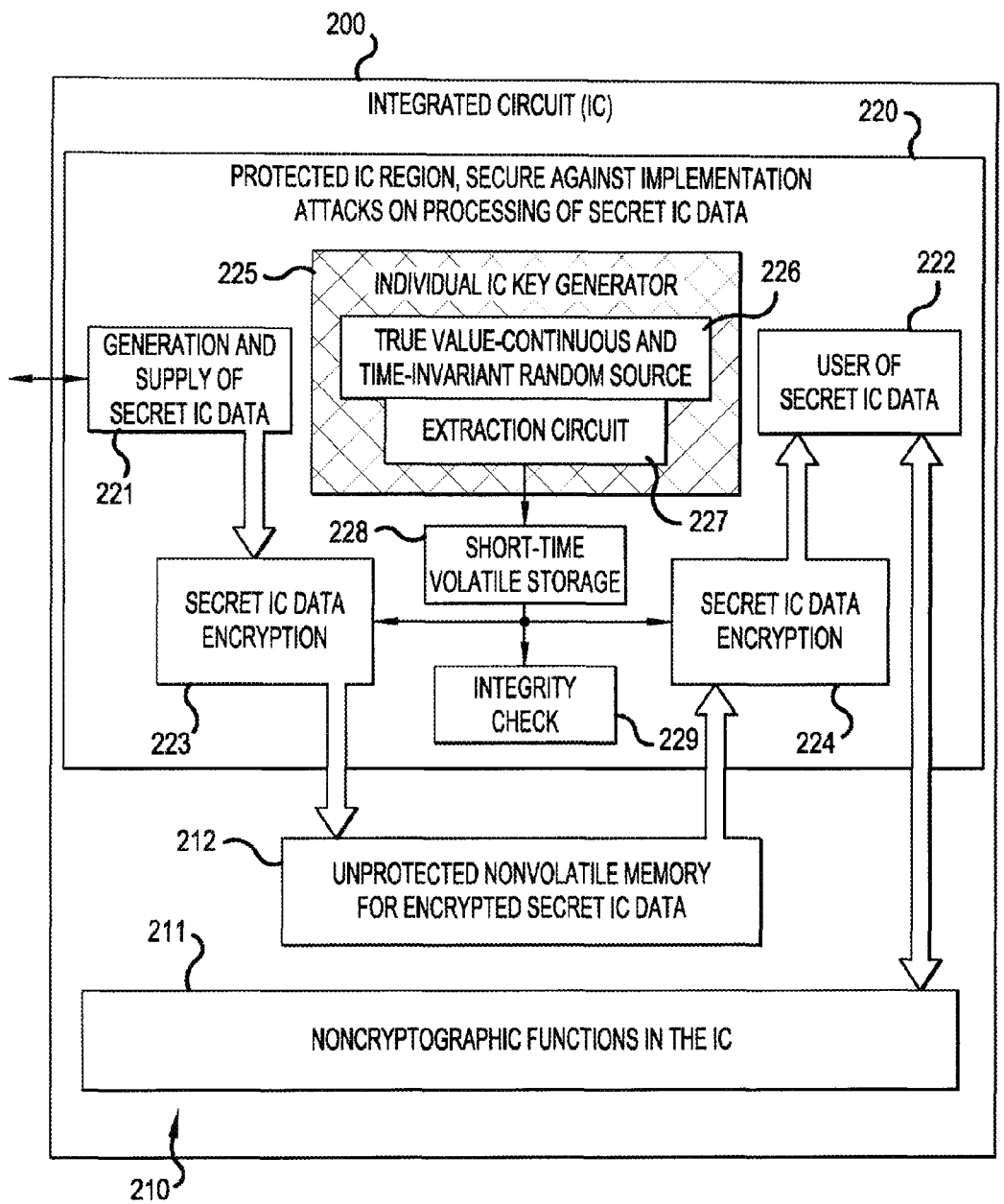
FIG. 2 shows a detailed schematic diagram of a protected integrated circuit for a strategy of encryption of the secret IC data and camouflaging the individual IC key.

FIG. 2 shows an IC 200 having an unprotected IC region 210 and an IC region 220, which is protected from implementation attacks. Unprotected region IC 210 contains noncryptographic functions 211 and an unprotected nonvolatile memory 212 for encrypted secret IC data. Protected IC region 220 is for processing the secret IC data; in particular in addition to generating and supplying secret IC data 221 and use of secret IC data 222, there is also secret IC data encryption 223 and secret IC data decryption 224. Furthermore, protected region 220 includes an individual IC key generator 225, which includes a true value-continuous and time-invariant random source 226 and an extraction circuit 227.

The individual IC key should be extracted only as needed from true value-continuous and time-invariant random source 226, in which it is in a secure unrecognizable and nondigital form (is camouflaged) by extraction circuit 227, and converted into digital form. This digital form should be deleted again immediately after the briefest possible use. Therefore, a module for short-term volatile storage 228 of the individual IC key is also provided in protected IC region 220. An integrity check 229 such as the generation of a hash value of the individual IC key is additionally provided in protected region 220.

In contrast with secure storage of secret IC data in plain text, the encryption of secret IC data using the individual IC key requires more data processing, e.g., extraction of the individual IC key into digital form, generation of a hash value for the integrity check and the encryption and decryption of the secret IC data per se. On the other hand, the use of measures against implementation attacks is much simpler in this case because only protective measures against implementation attacks on the processing of secret IC data are necessary. However, shielding and constant monitoring are no longer necessary.

The critical component of the schematic design diagramed in FIG. 2 is the true value-continuous and time-invariant random source 226, the design of which will now be discussed with reference to additional figures.

FIG. 3a shows a row of IC modules 301, 302, ..., 303, each having as a delay element a given integrated elementary circuit 310, 311, ..., 312 which is identical in design to all IC modules 301, 302, ..., 303. As explained in greater detail below, there are differences in the delays according to transit times $\tau^{(1)}, \tau^{(2)}, \ldots, \tau^{(M)}$, which are experienced by a signal applied to the corresponding integrated elementary circuit in its passage through the circuit, even with IC modules 301, 302, ..., 303 designed identically. Identically designed integrated elementary circuits 310, 311, ..., 312 may be concretely, for example, functionally identical logic gates, for example, inverters, OR circuits or AND circuits.

FIG. 3b schematically shows a gate transit time $\tau$ of a delay element 320. An input signal e(t) and an output signal a(t) may be picked up at delay element 320. A diagram 330 of input signal e(t) as a function of time t shows a rising flank 331 of input signal e(t) and a descending flank 332 of input signal e(t).

The position of rising flank 331 and/or of descending flank 332 on the time scale may be defined to advantage by the points in time, when the signal strength of the rising or falling signal assumes 50% of the maximum value of input signal e(t).

Similarly, a diagram 340 of output signal a(t) as a function of time t shows a rising flank 341 of output signal a(t) and a descending flank 342 of output signal a(t), the position of which on the time scale is advantageously defined by the points in time when the signal strength of the rising or falling signal assumes 50% of the maximum value of the output signal.

There is a time difference $\tau_{pdL}$ between the points in time assigned to ascending flank 331 of input signal e(t) and the points in time assigned to ascending flank 341 of output signal a(t). Similarly, there is a time difference $\tau_{pdH}$ between the points in time assigned to descending flank 332 of input signal e(t) and the points in time assigned to descending flank 342 of output signal a(t). The two time differences are approximately the same with most delay elements, i.e., $\tau$. The corresponding time difference is referred to as gate transit time $\tau$, because it reflects the time required by a signal to pass through the corresponding circuit.

Measurable variations in the gate transit time which follow a probability density p(T) are found even with similar delay elements manufactured within the same manufacturing operation. FIG. 3c illustrates one such probability density curve 350. As illustrated by the dashed lines shown between FIGS. 3a and 3c, the transit times $\tau^{(1)}, \tau^{(2)}, \ldots, \tau^{(M)}$ required by a signal applied to corresponding elementary circuit 310, 311, . . . , 312 each correspond to the random samples (implementations of random variable T) of probability density p(T).

To be able to use the continuous random variable T at all to form an individual binary IC key, which is usable under practical conditions, it is necessary to transform the value-continuous random variable T to a value-discrete binary random variable $\beta$ having a uniform distribution. This is possible by introducing an expected value E[T], for example, as a threshold value. If the present value of the continuous random variable is below this threshold value, the value of 0 is assigned to the binary random variable; otherwise the value of 1 is assigned, as shown in FIG. 3d.

However, in particular when using a single delay element per IC for generating a binary random variable, three essential implementation problems arise with this transformation: first, only one binary random number one-bit-wide may be generated with one threshold value; second, sufficiently precise estimation and implementation of the threshold value are difficult, and third, the differences between the measured value and the threshold value are very small, so that measurement disturbances often interfere with a clear-cut determination of the binary value and therefore increase the extraction error probability.

Therefore, according to the present invention, a matrix $M_{K \times L}$ of delay elements having delay times or transit times $\tau_{kl}$ (k=1, . . . , K; l=1, . . . , L) is used, in which the individual delay elements may be variably interconnected to form delay chains (VK) of chain length L. FIG. 4a shows such a matrix $M_{K \times L}$ of delay elements. Furthermore, interconnections among delay elements of matrix $M_{K \times L}$ to form two exemplary delay chains VK' and VK" are shown with dashed lines.

A plurality of binary random bits may be provided by the variable interconnection of delay elements in neighboring columns. Each delay chain is assigned a value-continuous random variable $T_{VK}$, which is formed from the sum of individual random variables, as shown in FIG. 4b on the concrete example of delay chains VK' and VK" and the respective random variables $T_{VK'}$ and $T_{VK''}$. It is assumed here that the individual random variables (which correspond to the individual delay elements) $T_{kl}$ (k=1, . . . , K l=1, . . . , L) are uncorrelated or only weakly correlated, so that the probability densities p($T_{VK'}$) and p($T_{VK''}$) of entire delay chains have a broader distribution, as shown in FIG. 4c (with a greater variance) than do those of individual delay elements p($T_{kl}$). As a consequence, the average delay difference represented by dots in FIG. 4c is also greater, which results in a lower extraction error probability (see property 9 above) when using chains of delay elements.

The comparison of the delay times of two such delay chains $VK_i$ and $VK_j$ with one another in this specific embodiment replaces the use of a threshold value in a simple and stable manner if the decision criterion illustrated in FIG. 4d is used. The difference in the delay times of two delay chains is thus used instead of the difference between the measured value and the threshold value. If the difference between delay time $T_{VK'} = T_{VKi}$ of one delay chain (designated as VK'=$VK_i$) selected as the first and delay time $T_{VK''} = T_{VKj}$ of a delay chain (designated as VK''=$VK_j$) selected to be the second is positive, then binary random variable $\beta_{ij}$ is assigned the value 1; otherwise a value of 0 is assigned, as shown in FIG. 4d.

The measurement disturbances also become far less important when using such delay chains. The delay of the entire chain is the sum of the delays of its individual elements. Thus, as is known from probability theory, the variance of the total delay is also greater than the variance of the delay of individual delay elements. The variance of the chain delay increases with the length of the chain. Thus, the average difference in the delay times (delay difference) of two delay chains becomes increasingly greater with a growing chain length L and therefore the extraction error probability becomes smaller.

FIG. 5 shows a circuit 500 according to the present invention in a first specific embodiment, showing a square-wave pulse generator 501, a double demultiplexer 502 having two signal inputs and K signal outputs as well as a control bus, indicated by an arrow, K×L delay elements $m_{kl}$ (k=0, . . . , K−1; l=1, . . . , L) each having one signal input and one signal output, L−1 double commutation circuits $C_1, C_2, \ldots, C_{L-1}$, each having K signal inputs and K signal outputs as well as two control buses, each labeled with arrows, a double multiplexer 503 having K signal inputs and two signal outputs and a control bus indicated by an arrow and a delay comparator 504 having two signal inputs and one signal output. The control codes applied to the control buses specify which connections between signal inputs and signal outputs of double demultiplexer 502, double commutation circuits $C_1$, $C_2, \ldots, C_{L-1}$ and double multiplexer 503 are or have been established. These connections are shown in FIG. 5 using dashed lines for a certain pair of delay chains VK', VK" as an example.

The following are in signal communication with one another:
  the output of square-wave pulse generator 501 with the two inputs of double demultiplexer 502,
  each input of double multiplexer 503 with exactly one output of double demultiplexer 502, each input being connected to another output, and each input being connectable to each output as a function of the setting of demultiplexer 502,
  the $k^{th}$ output of double demultiplexer 502 with the input of delay element $m_{kl}$, the output of delay element $m_{kl}$ for 1<L with the $k^{th}$ input of double commutation circuit $C_l$, and for l=L, with the $k^{th}$ input of double multiplexer 503, each input of double commutation circuit $C_l$ with exactly one output of the same double commutation circuit $C_l$, each input being connected to another output, and each input being connectable to each output as a function of the setting of double commutation circuit $C_l$, the output of delay element $m_{kl}$ with the $k^{th}$ input of double multiplexer 503, and the outputs of double multiplexer 503 with the inputs of delay comparator 504.

In addition, FIG. 5 also shows an encoder 510 for a channel code, whose output signals function as input signals for a transcoding circuit 520. The transcoding circuit generates control signals, which are applied to the control buses of double demultiplexer 502, of double commutation circuits $C_1, C_2, \ldots, C_{L-1}$ and of double multiplexer 503. Details about encoder 510 for a channel code and details about the channel code itself as well as transcoding circuit 520 are described further below.

To generate a certain bit of the individual IC key, a code word of the channel code corresponding to this bit is initially supplied by encoder 510 for a channel code and converted into corresponding control signals by transcoding circuit 520. These control signals are applied to the control inputs of double demultiplexer 502, double commutation circuits $C_1$, $C_2 \ldots, C_{L-1}$, and double multiplexer 503 to form the two chains of delay elements, a comparison of which yields the desired bit of the individual IC key. Next a square-wave signal is generated in square-wave pulse generator 501 and is applied simultaneously to both signal inputs of double demultiplexer 502, then passing through both set chains (selected by the code word of the channel code and its transcoding circuit) of delay elements. From the random distribution of the delay times of individual delay elements $m_{kl}$ a transit time of the square-wave signal through the corresponding chain of delay elements $m_{kl}$, is obtained, this transit time being different, depending on the chain just set. This transit time difference is evaluated with the aid of delay comparator 504. If it is found in the present case that the square-wave signal of the first chain has reached the delay comparator after that of the second chain, this corresponds to a value 1 of generated bit $\beta_{ij}$. If the square-wave signal of the second chain had arrived after the first chain, a value of 0 would have been assigned to this bit.

Additional bits of the individual IC key are obtained through other code words of the channel code.

FIG. 6a shows an example of a setting of double commutation circuit 610. For a matrix of K×L delay elements, K signal inputs 611.1, . . . , 611.K and K signal outputs 612.1, . . . , 612.K are required, only a selection of which is shown in FIG. 6a, as indicated by the dashed lines. Which signal inputs and which signal outputs are connected to one another here depends on the control signals applied to the control inputs (control bus) of the double commutation circuit, as indicated by arrows in FIG. 6a.

FIG. 6b shows in detail the circuit technology used in the implementation of a double commutation circuit having K signal inputs and K signal outputs. FIG. 6b shows a selection of K signal lines 621.1, . . . , 621.K and K signal lines 636.1, . . . , 636.K. The signal lines not shown are each indicated by dots. Furthermore, FIG. 6b shows two multiplexers 622, 623, each having K signal inputs and each having A control inputs, A being the integer following $\log_2(K)$, and one signal output as well as two demultiplexers 624, 625, each having one signal input, K signal outputs and A control inputs.

Each of K signal lines 621.1, . . . , 621.K is in signal communication with exactly one of the K signal inputs of multiplexer 622 and with exactly one of the K signal inputs of multiplexer 623, each signal line 621.k being in signal communication with the $k^{th}$ signal input of multiplexers 622 and 623.

In a given multiplexer 622, 623, there is a signal connection between the signal output and exactly one of the K signal inputs. Which of the K signal inputs is connected to the signal output depends on the particular signal applied to the control inputs of multiplexer 622, 623.

Furthermore, FIG. 6b shows a selection of A signal lines 629.1, . . . , 629.A, 630.1, . . . , 630.A, 631.1, . . . , 631.A, 632.1, . . . , 632.A for each multiplexer 622, 623 and each demultiplexer 624, 625, the signal lines (not shown) being represented by dots. Each signal line 629.1, . . . , 629.A is in signal communication with another control input of multiplexer 622; each signal line 630.1, . . . , 630.A is in signal communication with another control input of multiplexer 623; each signal line 631.1, . . . , 631.A is in signal communication with another control input of demultiplexer 624, and each signal line 632.1, . . . , 632.A is in signal communication with another control input of demultiplexer 625. The control signal, which determines the particular setting of multiplexers 622, 623 and demultiplexers 624, 625, is supplied via signal lines 629.1, . . . , 629.A, 630.1, . . . , 630.A, 631.1, . . . , 631.A, 632.1, . . . , 632.A, each of which is in signal communication with their control inputs.

Furthermore, FIG. 6b shows a signal line 626, which connects the signal output of multiplexer 622 to the signal input of demultiplexer 624, and a signal line 627, which connects the signal output of multiplexer 623 to the signal input of demultiplexer 625.

The signal input of demultiplexer 624 is in signal connection with exactly one of the K signal outputs of demultiplexer 624. Which one this is, will be defined by the signals applied to the A control inputs of demultiplexer 624 via signal lines 631.1, . . . , 631.A and changes accordingly with a change in this signal.

Similarly, the signal input of demultiplexer 625 is in signal connection with exactly one of the K signal outputs of demultiplexer 625. Which one this is, will be defined by the signals applied to the A signal inputs of demultiplexer 625 via signal lines 632.1, . . . , 632.A and changes accordingly with a change in this signal.

Furthermore, FIG. 6b shows a selection of K OR circuits 633.1, . . . , 633.K, each having two signal inputs and one signal output, the OR circuits (not shown) being represented by dots, and additional signal lines 634.1, . . . , 634.K, 635.1, . . . , 635.K as well as 636.1, . . . , 636.K. Signal lines 634.1, . . . , 634.K each connect one of the K signal outputs of demultiplexer 624 to the first signal input of one of OR circuits 633.1, . . . , 633.K. Signal lines 635.1, . . . , 635.K each connect one of the K signal outputs of demultiplexer 625 to the second signal input of one of OR circuits 633.1, . . . , 633.K. Signal lines 636.1, . . . , 636.K are in signal communication with the signal outputs of the K OR circuits and correspond to the K outputs 612.1, . . . , 612.K of the double commutation circuit as shown in FIG. 6a.

The gates and line connections in these double commutation circuits as well as in the double multiplexers and the demultiplexers also contribute to the total delay of a delay chain due to their own delay in addition to the actual delay elements. Therefore the delays within a double commutation circuit are allocated to the next delay element for interpretation of the overall circuit in FIG. 5 and thus an equivalent delay element is created. Due to the uniform design of the double commutation circuits and the multiplexers as well as the demultiplexers, the statistical properties of the equivalent delay matrix are not altered qualitatively.

FIG. 7a shows a more specific embodiment of double commutation circuit 710 for the case when K=4. The double commutation circuit has four signal inputs 711, 712, 713, 714 and four signal outputs 721, 722, 723, 724. In addition, the double commutation circuit has two control inputs 731, 732 indicated by arrows. Which of two signal inputs 711, 712, 713, 714 will be connected to which particular signal outputs 721, 722, 723, 724 depends on the signals applied to control inputs 731, 732. As indicated by the dashed lines, signal input 712 should be connected to signal output 721 and signal input 714 should be connected to signal output 722 in this example.

FIG. 7b shows the implementation of this circuit in the circuit technology. FIG. 7b shows four signal lines 741.1, . . . , 741.4. Furthermore, FIG. 7b shows two multiplexers 742, 743, each having four signal inputs and two control inputs plus one signal output, and two demultiplexers 744, 745, each having one signal input, four signal outputs, and two control inputs.

In addition, FIG. 7b shows two signal lines 749.1, 749.2; 750.1, 750.2; 751.1, 751.2; 752.1, 752.2 for each multiplexer 742, 743 and for each demultiplexer 744, 745. Each signal line 749.1, 749.2 is in signal communication with one other control input of demultiplexer 744; each signal line 750.1, 750.2 is in signal communication with one other control input of signal multiplexer 743; each signal line 751.1, 751.2 is in signal communication with one other control input of multiplexer 743, and each signal line 752.1, . . . , 752.2 is in signal communication with one other control input of demultiplexer 745. The control signal, which determines the particular setting of multiplexers 742, 743 and demultiplexers 744, 745, is sent over signal lines 749.1, 749.2; 750.1, 750.2; 751.1, 751.2; 752.1, 752.2, each of which is in signal communication with its control inputs.

Each of four signal lines 741.1, . . . , 741.4 is in signal communication with exactly one of the four signal inputs of multiplexer 742 and with exactly one of the four signal inputs of multiplexer 743.

Each multiplexer 742, 743 also has four triple AND circuits 742.1, . . . , 742.4 and 743.1, . . . , 743.4 and one quadruple OR circuit 742.5 and 743.5 as well as two inverters 742.6, 742.7 and 743.6, 743.7. Each triple AND circuit 742.1, . . . , 742.4 and 743.1, . . . , 743.4 has three signal inputs and one signal output. The following input signals are supplied at the signal inputs of triple AND circuits 742.1, . . . , 742.4 and 743.1, . . . , 743.4:

at the inputs of triple AND circuit 742.1, the signal supplied by signal line 741.1 via the first signal input of multiplexer 742, the signal supplied by signal line 749.1 and inverted by passing through inverter 742.6 and the signal supplied by signal line 749.2 and inverted by passing through inverter 742.7, at the inputs of triple AND circuit 742.2, the signal supplied by signal line 741.2 via the second signal input of multiplexer 742, the signal supplied by signal line 749.1 and inverted by passing through inverter 742.6 and the signal supplied by signal line 749.2, at the inputs of triple AND circuit 742.3, the signal supplied by signal line 741.3 via the third signal input of multiplexer 742, the signal supplied by signal line 749.1 and the signal supplied by signal line 749.2 and inverted by passing through inverter 742.7, at the inputs of triple AND circuit 742.4, the signal supplied by signal line 741.4 via the fourth signal input of multiplexer 742, the signal supplied by signal line 749.1 and the signal supplied by signal line 749.2;

at the inputs of triple AND circuit 743.1, the signal supplied by signal line 741.1 via the first signal input of multiplexer 743, the signal supplied by signal line 751.1 and inverted by passing through inverter 743.6 and the signal supplied by signal line 751.2 and inverted by passing through inverter 743.7, at the inputs of triple AND circuit 743.2, the signal supplied by signal line 741.2 via the second signal input of multiplexer 743, the signal supplied by signal line 751.1 and inverted by passing through inverter 743.6 and the signal supplied by signal line 751.2, at the inputs of triple AND circuit 743.3, the signal supplied by signal line 741.3 via the third signal input of multiplexer 743, the signal supplied by signal line 751.1 and the signal supplied by signal line 751.2 and inverted by passing through inverter 743.7, at the inputs of triple AND circuit 743.4, the signal supplied by signal line 741.4 via the fourth signal input of multiplexer 743, the signal supplied by signal line 751.1 and the signal supplied by signal line 751.2.

The signal outputs of triple AND circuits 742.1, . . . , 742.4 are connected to the signal inputs of quadruple OR circuit 742.5, whose signal output forms the signal output of multiplexer 742. Similarly, the signal outputs of triple AND circuits 743.1, . . . , 743.4 are connected to the signal inputs of quadruple OR circuit 743.5, whose signal output forms the signal output of multiplexer 743.

This design of the multiplexers results in the following:
when circuit-logic signal combination 00 is applied to signal lines 749.1, 749.2 and 751.1, 751.2, the signal applied to the first signal input of multiplexer 742 and 743 is relayed to its output,
when circuit-logic signal combination 01 is applied to signal lines 749.1, 749.2 and 751.1, 751.2, the signal applied to the second signal input of multiplexer 742 and 743 is relayed to its output,
when circuit-logic signal combination 10 is applied to signal lines 749.1, 749.2 and 751.1, 751.2, the signal applied to the third signal input of multiplexer 742 and 743 is relayed to its output,
when circuit-logic signal combination 11 is applied to signal lines 749.1, 749.2 and 751.1, 751.2, the signal applied to the fourth signal input of multiplexer 742 and 743 is relayed to its output.

Applying a circuit-logic signal combination "ab" to two signal lines X, Y means that the signal "a" is applied to signal line X and the signal "b" is applied to signal line Y.

Furthermore, FIG. 7b shows a signal line 746, which connects the signal output of multiplexer 742 to the signal input of demultiplexer 744, and a signal line 747, which connects the signal output of multiplexer 743 to the signal input of demultiplexer 745.

Demultiplexers 744 and 745 also each have four triple AND circuits 744.1, . . . , 744.4 and 745.1, . . . , 745.4, each of which has three signal inputs and one signal output. The following input signals are supplied at the signal inputs of triple AND circuits 744.1, . . . , 744.4 and 745.1, . . . , 745.4 by signal connections:

at the inputs of triple AND circuit 744.1, the signal supplied by signal line 746 via the signal input of demultiplexer 744, the signal supplied by signal line 750.1 and inverted by passing through inverter 744.6 and the signal supplied by signal line 750.2 and inverted by passing through inverter 744.7, at the inputs of triple AND circuit 744.2, the signal supplied by signal line 746 via the signal input of demultiplexer 744, the signal supplied by signal line 750.1 and inverted by passing through inverter 744.6 and the signal supplied by signal line 750.2, at the inputs of triple AND circuit 744.3, the signal supplied by signal line 746 via the signal input of demultiplexer 744, the signal supplied by signal line 750.1 and the signal supplied by signal line 750.2 and inverted by passing through inverter 744.7, at the inputs of triple AND circuit 744.4, the signal supplied by signal line 746 via the signal input of demultiplexer 744, the signal supplied by signal line 750.1 and the signal supplied by signal line 750.2;

at the inputs of triple AND circuit 745.1, the signal supplied by signal line 747 via the signal input of demultiplexer 745, the signal supplied by signal line 752.1 and inverted by passing through inverter 745.6, and the signal supplied by signal line 752.2 and inverted by passing through inverter 745.7, at the inputs of triple AND circuit 745.2, the signal supplied by signal line 747 via the signal input of demultiplexer 745, the signal supplied by signal line 752.1 and inverted by passing through inverter 745.6 and the signal supplied by signal line 752.2, at the inputs of triple AND circuit 745.3, the signal supplied by signal line 747 via the signal input of demultiplexer 745, the signal supplied by signal line 752.1 and the signal supplied by signal line 752.2 and inverted by passing through inverter 745.7, at the inputs of triple AND circuit 745.4, the signal supplied by signal line 747 via the signal input of demultiplexer 745, the signal supplied by signal line 752.1 and the signal supplied by signal line 752.2.

This design of demultiplexers 744, 745 results in the following:

when circuit-logic signal combination 00 is applied to signal lines 750.1, 750.2 and 752.1, 752.2, the signal applied to the signal input of demultiplexer 744 and 745 is relayed to its first output, when circuit-logic signal combination 01 is applied to signal lines 751.1, 751.2 and 752.1, 752.2, the signal applied to the signal input of demultiplexer 744 and 745 is relayed to its second output, when circuit-logic signal combination 10 is applied to signal lines 751.1, 751.2 and 752.1, 752.2, the signal applied to the signal input of demultiplexer 744 and 745 is relayed to its third output, when circuit-logic signal combination 11 is applied to signal lines 751.1, 751.2 and 752.1, 752.2, the signal applied [to the] signal input of multiplexer 742 and 743 is relayed to its fourth output.

The $n^{th}$ output of demultiplexer 744 and/or 745 here is formed by the output of triple AND circuit 744.n and/or 745.n.

Furthermore, FIG. 7b shows four OR circuits 748.1, . . . , 748.4, each having two signal inputs and one signal output. The signal inputs of OR circuit 748.1 are in signal connection to the output of triple AND circuit 744.1 and to the output of triple AND circuit 745.1; the signal inputs of OR circuit 748.2 are in signal connection to the output of triple AND circuit 744.2 and to the output of triple AND circuit 745.2; the signal inputs of OR circuit 748.3 are in signal connection to the output of triple AND circuit 744.3 and to the output of triple AND circuit 745.3, and the signal inputs of OR circuit 748.4 are in signal connection to the output of triple AND circuit 744.4 and to the output of triple AND circuit 745.4.

The outputs of OR circuits 748.1, . . . , 748.4 form the signal outputs of the double commutation circuit and correspond to outputs 721, . . . , 724 in FIG. 7a.

It is known from information theory that random binary codes having code words whose bits are statistically independent (uncorrelated) achieve the greatest possible minimal Hamming distance between all code words if the length of the code words is large enough (Gilbert-Warshamov bound). To minimize the correlation between bits, the chain pairs which use the fewest shared delay elements in pairs (pairs of chain pairs) should thus be selected in selecting N chain pairs, which generate an N-bit-long individual IC key.

A Hamming distance between two chain pairs may be defined for this purpose. It shall be assumed that this Hamming distance is at its maximum (equal to length L of the chain) when the two chain pairs do not use any shared delay element. If two chain pairs in $G_s$ columns of delay matrix $M_{K \times L}$ use at least one shared delay element, let the Hamming distance between chain pairs $KP_{ij}$ and $KP^{km}$ be $$d_{Hs}(KP_{ij}, KP_{km}) = L - G_s. \quad (1)$$

This is known as a strong Hamming distance between two chain pairs.

In the case of a delay matrix having only two or three rows (K<4), a Hamming distance defined in this way is always equal to zero (because two completely independent chain pairs require four different delay elements in one column). To also define a measure for the differentiability of two chain pairs in this case, the weak Hamming distance between two chain pairs $d_{Hw}(KP_{ij}, KP_{km})$ is introduced:

Let $G_w$ be the number of columns in $M_{K \times L}$ in which both the first delay chains (VK') and the second delay chains (VK'') of two chain pairs use the same delay element. The weak Hamming distance between these chain pairs is then:

$$d_{Hw}(KP_{ij}, KP_{km}) = L - G_w. \quad (2)$$

Starting with the general assumption that the individual delay elements of delay matrix $M_{K \times L}$ are uncorrelated with one another in the ideal case, Hamming distances defined in this way between two chain pairs yield a measure of the correlation of the bits generated by these chain pairs. Only if the strong Hamming distance is at its maximum ($d_{Hs}(KP_{ij}, KP_{km}) = L$) are the random bits thereby generated uncorrelated. At the same value, the strong Hamming distance shows a much lower correlation than the weak Hamming distance. The smaller the Hamming distance (strong or weak) of the generating chain pairs, the greater is the correlation in the bits thereby generated.

FIG. 8 illustrates three examples of determination of these distances. In Example 8a, the bits generated by the two chain pairs are completely uncorrelated, whereas the bits generated in the other two examples are more correlated (in 8b) or less correlated (in 8c).

The Hamming distances between chain pairs as defined above may be used as a criterion for selection of chain pairs which are suitable with respect to property 10 required above (large Hamming distance between individual keys) for generating an individual IC key. This is used to determine a selection code for chain pairs, which is explained in greater detail in the remaining course of this document.

To achieve the greatest possible minimal Hamming distance between any two individual IC keys ascertained by the method in different ICs, it is advantageous if the individual bits of the individual IC keys are as uncorrelated as possible (as in the ideal case with random binary codes).

To achieve this, the pairs of chain pairs, which generate the individual IC key bits, must have the largest possible minimal strong (or at least weak) Hamming distance between one another. This may be ensured by using a channel code, which itself has the largest possible minimal Hamming distance between its code words. The individual codes of this channel code control the setting of the L−1 double commutation circuits (via the corresponding control buses) after a corresponding transcoding (by circuit 520 in FIG. 5). The channel code encoder and the corresponding transcoder determine the selection code for chain pairs.

As shown on the basis of FIGS. 8*a, b, c*, the delay pairs (identified as [x;y]) of a chain pair determine the particular Hamming distances between two chain pairs. In all FIGS. 8*a*, 8*b*, and 8*c*, two bits of a bit of an individual IC key, determined using a 4×4 matrix of delay elements, are correlated with one another. Accordingly, all q allowed delay pairs from $K^2$ possible pairs are determined first. For K=4, for example, there are 16 possible delay pairs: [0;0], [0;1], [0;2], [0;3], [1;0], [1;1], [1;2], [1;3], [2;0], [2;1], [2;2], [2;3], [3;0], [3;1], [3;2], and [3;3]. Since the chain pairs having shared delay elements are not allowed, this eliminates [0;0], [1;1], [2;2], and [3;3], so that now there remain q=12 allowed delay pairs.

FIG. 8*a* shows a first interconnection (chain pair) 810 of a 4×4 matrix of delay elements, in which a first chain 811 and a second chain 812 are formed and a second interconnection (chain pair 815), in which a first chain 816 and a second chain 817 are formed, one chain pair being formed by applying one code word of the corresponding selection code for chain pairs (channel code having corresponding transcoding) to a circuit configuration having a design similar to that shown in FIG. 5. The concrete design of this circuit configuration is described further below.

Below each column of interconnections 810 and 815 are shown the delay pairs [x;y], which are compared with one another in this column, these pairs being obtained from the delay elements belonging to the chain pairs (811, 812) and (816, 817) and located in this column.

The two chain pairs (811, 812) and (816, 817) do not contain a shared delay pair of a chain pair in any column of the 4×4 matrix, i.e., $G_W=0$ and the weak Hamming distance is $d_{Hw}=4$. In addition, the chain pairs (811, 812) and (816, 817) use different delay elements in each column, i.e., $G_s=0$, and thus the strong Hamming distance is also $d_{Hs}=4$.

FIG. 8*b* shows a first interconnection (chain pair) 820 of a 4×4 matrix of delay elements, in which a first chain 821 and a second chain 822 are formed and a second interconnection (chain pair) 825 in which a first chain 826 and a second chain 827 are formed, one chain pair being formed by applying one code word of the corresponding selection code for chain pairs (channel code having corresponding transcoding) to a circuit configuration having a design similar to that in FIG. 5. The concrete design of this circuit configuration is described in greater detail below.

Below each column of interconnections 820 and 825 are shown the delay pairs [x;y], which are compared with one another in this column, these pairs being obtained from the delay elements belonging to the chain pairs (821, 822) and (826, 827) and located in this column.

The two chain pairs (821, 822) and (826, 827) contain a shared delay pair of a chain pair in the first column of the 4×4 matrix because in both interconnection 820 and interconnection 825, a comparison of delay elements 0 and 1 in the first column enters into the result obtained, as indicated by the dashed arrow in FIG. 8*b*. Therefore, $G_W=1$, and the weak Hamming distance is $d_{Hw}=3$.

In addition, the chain pairs (821, 822) and (826, 827) use at least one shared delay element in each column. Delay element 0 enters into the comparison of chain pairs in columns 1, 3 and 4 because it is used in first chain 821 of first interconnection 820 and in first chain 826 of second interconnection 825 in columns 1, 3 and 4. Delay element 1 enters into the comparison of chain pairs in column 2 because it appears in second chain 822 of first interconnection 820 and in first chain 826 of second interconnection 825. Therefore, $G_s=4$ and thus $d_{Hs}=0$.

FIG. 8*c* shows a first interconnection (chain pair) 830 of a 4×4 matrix of delay elements, in which a first chain 831 and a second chain 832 are formed, and a second interconnection (chain pair) 835 in which a first chain 836 and a second chain 837 are formed, one chain pair being formed by applying one code word of the corresponding selection code for chain pairs (channel code having corresponding transcoding) to a circuit configuration having a design similar to that in FIG. 5. The concrete design of this circuit configuration is described further below.

Below each column of interconnections 830 and 835 are shown the delay pairs [x;y], which are compared with one another in this column, these pairs being obtained from the delay elements belonging to the chain pairs (831, 832) and (836, 837) and located in this column.

The two chain pairs (831, 832) and (836, 837) contain a shared delay pair of a chain pair in the first column of the 4×4 matrix, because in both interconnection 830 and interconnection 835, a comparison of delay elements 0 and 1 in the third column enters into the result obtained, as indicated by the left dashed arrow in FIG. 8*c*. Therefore, $G_W=1$ and the weak Hamming distance is $d_{Hw}=3$.

In addition, the chain pairs (831, 832) and (836, 837) use at least one shared delay element in three columns. In column 1, this is delay element 1; in column 2, this is delay element 0, and in column 3, these are delay elements 0 and 1. However, different delay elements are used in the fourth column, which is indicated by the right dashed arrow in FIG. 6*c*. Therefore, $G_s=3$ and thus $d_{Hs}=1$.

The code words of the selected channel code define the chain pairs via their individual delay pairs, but the circuit is triggered by the corresponding setting of the L−1 double commutation circuits, so the code words of the channel code must be transcoded to a setting of the double commutation circuits. Instead, a transcoding circuit (transcoder) 520 is inserted between encoder 510 for the channel code and the interconnectable delay matrix, as shown in FIG. 5. This circuit also assumes the function of controlling the double demultiplexers and multiplexers. A selected channel code (L, N, $d_{Hm})_q$ and the corresponding transcoding circuit determine a selection code for chain pairs. In the notation (L, N, $d_{Hm})_q$, L denotes the length of the code word, N denotes the number of code words, $d_{Hm}$ denotes the minimal Hamming distance between two code words in the channel code, and q denotes the number of possible code symbols.

For delay matrices having K>2, in some cases the Reed-Solomon codes have proven successful as channel codes using simple encoding methods and the largest possible minimal Hamming distance $d_{Hm}$ (they reach the upper Singleton bound). These channel codes exist only for certain numbers $q=2^n \leq K^2$ (n=2, 3, . . . ) of code symbols and $q^k=N$ code words (0<k<n) of length $L=2^n-1$, where $d_{Hm}=L-N$. Thus for many formats of the delay matrix and certain values of length N of the individual IC key, direct use of Reed-Solomon codes is impossible except when they are modified accordingly (shortened or converted to dots) or only a subset of code words of the Reed-Solomon code is used. The selection of possible code symbols may also be varied within certain limits and thus adapted to the selected channel code by allowing only q certain delay pairs of a total of $K^2$ possible delay pairs (which are allocated to individual code symbols). It is possible in this way to increase the strong Hamming distance between the selected chain pairs.

For any format of delay matrix $M_{K \times L}$ and any predefined number N of bits of the individual IC key, a tailored nonlinear channel code $(L, N, d_{Hm})_q$ having the largest possible minimal Hamming distance $d_{Hm}$, which is obtained by a computer-controlled search and optimization method, is recommended as an alternative. Since code rate $R=(\log_2 N)/L$ of these channel codes is very small (in the ranges $64 \leq N \leq 256$ and $32 \leq L \leq 256$ for realistic parameter values), most search and optimization algorithms are within feasible complexity limits FIG. 9a shows a simple example of a nonlinear channel code $(L=4, N=6, d_{Hm}=3)_{q=6}$. The N=6 code words 9.1, 9.2, 9.3, 9.4, 9.5, and 9.6 of length L=4 are composed of q=6 possible code symbols $\{s_1, s_2, s_3, s_4, s_5, s_6\}$. Due to the paired comparison of all code words, it is possible to determine that the minimal Hamming distance in this channel code is $d_{Hm}=3$.

Using this channel code, the two chain pairs in FIG. 8c are also to be configured as an example, in addition to four other chain pairs. The first chain pair 830 has L=4 delay pairs [0;1], [0;2], [0;1] and [0;3]. Three of these [0;1], [0;2] and [0;3] are different from one another. In the second chain pair 835, which includes delay pairs [1;3], [2;0], [0;1] and [2;1] there are in addition three different delay pairs [1;3], [2;0] and [2;1].

Since the individual code symbols of the channel code must be allocated to different delay pairs, one possible allocation is: $s_1=[0;1]$, $s_2=[0;2]$, $s_3=[0;3]$, $s_4=[1;3]$, $s_5=[2;0]$, $s_6=[2;1]$.

Accordingly, chain pair 830 is shown with code word 9.2 and chain pair 835 with code word 9.5. The other ten delay pairs [0;0], [1;0], [1;1], [1;2], [2;2], [2;3], [3;0], [3;1], [3;2], and [3;3] are not used in this example.

The channel codes selected in FIG. 9a, having the code symbol-to-delay pair allocation selected above must then be transcoded into control signals for the correct settings of the corresponding double commutation circuits.

One delay chain is always uninterrupted, so demultiplexers 624 and 625, which are connected at the left of the delay elements in a column of the delay matrix and multiplexers 622 and 623, which are connected at the right of the delay elements of the same column, must be triggered with the same control signal as that shown in FIG. 9b. Otherwise the delay chain would have interruptions and would thus be nonfunctional.

These shared control signals may always be obtained by a fitting binary representation (transcoding) of polyvalent code symbols $s_i$; i=1, 2, . . . , q, of the channel code used as code words of the selection code.

For code word 9.5 of the channel code in FIG. 9a, which configures chain pair 835 in FIG. 8c, the fitting binary representations of the code symbols in FIG. 9b are embodied as one example of transcoding of a channel code. The dashed arrows indicate the connections of two delay chains 836 and 837 of chain pair 835.

FIG. 9b shows the circuit 9.10 corresponding to this example. This shows a double demultiplexer 9.11, three double commutation circuits 9.12, 9.13, 9.14, the design of which is shown in detail in FIG. 7b and is explained in the respective description, a double multiplexer 9.15, columns 9.16, 9.17, 9.18, and 9.19 of the 4×4 matrix of delay elements situated between double demultiplexer 9.11 and double commutation circuit 9.12, between double commutation circuits 9.12 and 9.13, between double commutation circuits 9.13 and 9.14 and between double commutation circuits 9.14 and double multiplexer 9.15, a generator 9.20 for initial values of code words, a channel code encoder 9.21, a transcoder 9.22 and a register 9.23 for the code words of the selection code. A code word of the channel code is generated in channel code encoder 9.21 from the initial value, which is predefined by generator 9.20, this code word then being transcoded by transcoder 9.22 into the corresponding code word of the selection code, which is provided in register 9.23 and predefines via the control lines and the control bus, now the elements of the matrix of delay elements are interconnected to form the two chains.

Figure 10:
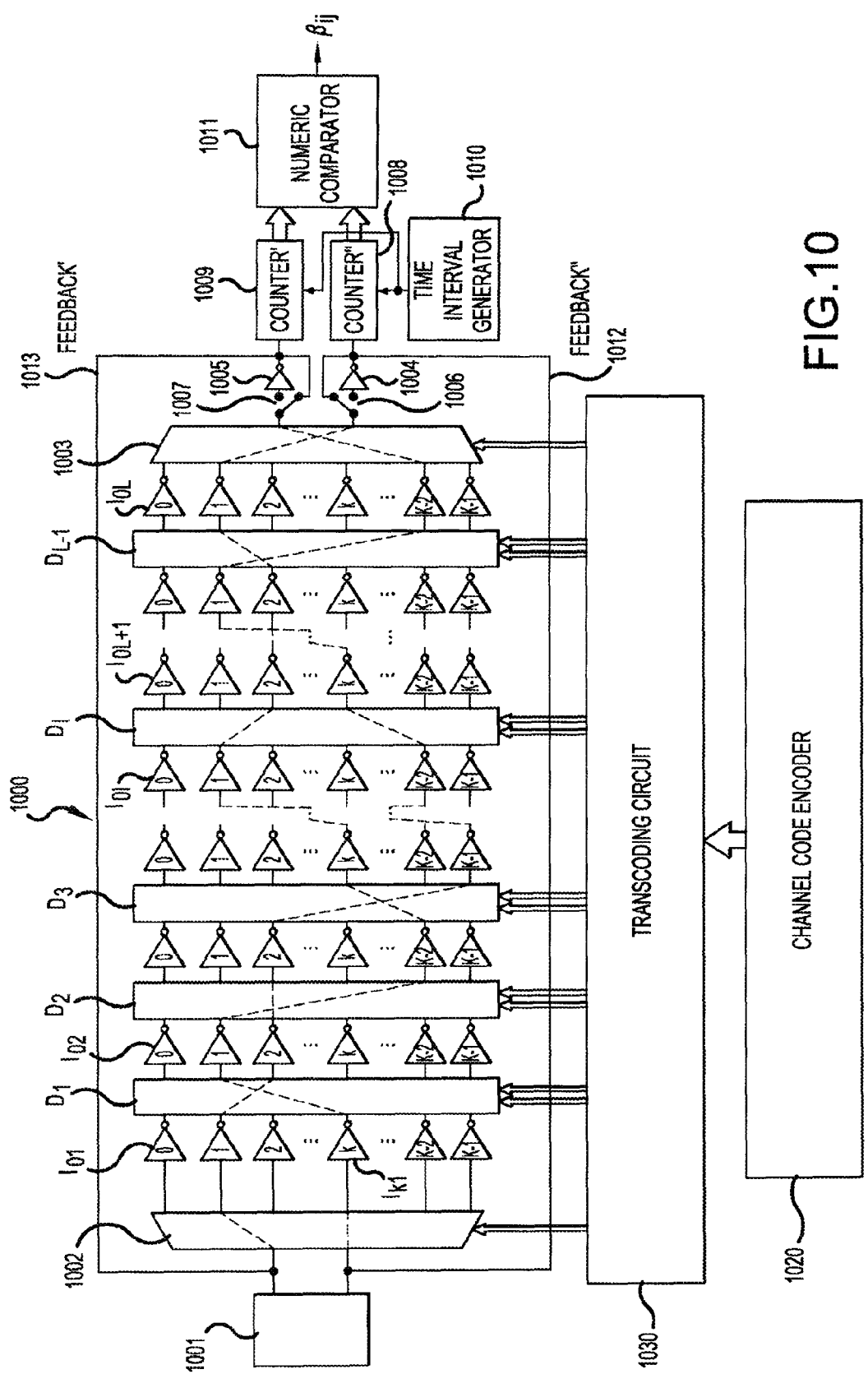
FIG. 10 shows a circuit configuration according to a second specific embodiment of the present invention.

FIG. 10 shows a particularly preferred specific embodiment of the present invention.

FIG. 10 shows a square-wave pulse generator 1001, a double multiplexer 1002 having two signal inputs and K signal outputs as well as a control input, which is indicated by a double arrow (and which is applied to the control bus of the double multiplexer), K×L inverters $I_{kl}$ (k=0, . . . , K−1; l=1, . . . , L) as delay elements, inverters $I_{kl}$ having one control input and one control output, L−1 double commutation circuits $D_1, D_2, \ldots, D_{L-1}$ each having K signal inputs and K signal outputs as well as two control inputs indicated by double arrows, a double demultiplexer 1003 having K signal inputs, one signal output and one control input indicated by a double arrow, two inverters 1004, 1005, two switches 1006, 1007, two counters 1008, 1009, each having one signal input, one control input and one signal output, a time interval generator 1010 having one signal output and a numeric comparator 1011 having two signal inputs and one signal output plus two feedback signal lines 1012, 1013.

The selection code applied to the control inputs predefines which connections are established between the signal inputs and signal outputs of double multiplexer 1002, double commutation circuits $D_1, D_2, \ldots, D_{L-1}$ and double demultiplexer 1003. These connections are shown with dashed lines in FIG. 10 as an example.

The following are in signal communication with one another:
  the signal output of square-wave pulse generator 1001 with both inputs of double multiplexer 1002,
  each input of double multiplexer 1002 with exactly one output of double multiplexer 1002, each input being connected to one other output, and each input being connectable to each output as a function of the setting of multiplexer 1002,
  the $k^{th}$ output of double multiplexer 1002 with the input of delay element $I_{kl}$,
  the output of delay element $I_{kl}$ with the $k^{th}$ input of double commutation circuit $D_l$ for l<L, and with the $k^{th}$ input of double demultiplexer 1003 for l=L,
  each input of double commutation circuit $D_l$ with exactly one output of the same double commutation circuit $D_l$, each input being connected to another output, and each input being connectable to each output as a function of the setting of double commutation circuit $K_l$,
  the first and second output(s) of double demultiplexer 1003 after inversion by inverter 1004 and 1005 if L is even, or without inversion when switches 1006 and 1007 are closed, with the inputs of counters 1008 and 1009 via these switches, and with feedback over signal lines 1012, 1013 with the first and second input(s) of double multiplexer 1002, the signal output of time interval generator 1010 with the control inputs of counters 1008, 1009 and the signal outputs of counters 1008, 1009 with the signal inputs of numeric comparator 1011.

In addition, FIG. 10 shows a channel code encoder 1020 for a channel code, whose output signal functions as the input signal for a transcoding circuit (transcoder) 1030. The transcoding circuit generates a control signal, which is applied to the control inputs of double multiplexer 1002, of double commutation circuits $D_1, D_2, \ldots, D_{L-1}$ and of double demultiplexer 1003. Details about channel code encoder 1020 for a channel code and the channel code itself as well as transcoding circuit 1030 are described further below.

To generate a certain bit of the individual IC key, a code word of the channel code corresponding to this bit is initially provided by channel code encoder 1020 for a selected channel code and is converted into a corresponding control signal by transcoding circuit 1030. This control signal is applied to the control inputs of double multiplexer 1002, of double commutation circuits $D_1, D_2, \ldots, D_{L-1}$ and of double demultiplexer 1003 to form the two [interconnected] chains of delay elements, the comparison of which yields the desired bit of the IC individual key. Time interval generator 1010 is started next and two simultaneous square-wave signals are generated by square-wave pulse generator 1001 and applied simultaneously to both signal inputs of double multiplexer 1002, and then the two set chains of delay elements pass through repeatedly (because of feedback signal lines 1012, 1013), such that the respective counter 1008 and 1009 allocated to the chain is incremented by one at the end of each run-through. The distribution of the delay times of the individual delay elements yields, within the time interval predefined by the time interval generator, a different counter reading because of the different transit time of the square-wave signal through the corresponding chain of delay elements, depending on the chain just set. If the predefined time interval has elapsed, the time interval generator delivers a control signal to counters 1008, 1009, which causes output of the counter reading to numeric comparator 1011 and the subsequent resetting of counters 1008, 1009. Numeric comparator 1011 then determines a corresponding bit $\beta_{ij}$ of the individual IC key from the difference between the counter readings. Additional bits of the individual IC key are obtained by other code words of the channel code.

Thus, according to this specific embodiment, the two delay chains of L delay elements in particular are fed back to their respective input, and inverters are used as delay elements.

If L is uneven (or also if L is even, if inverters 1004 and 1005 are additionally used), two self-oscillating ring oscillators are formed, their respective oscillation frequencies $f_{RO}=1/2\tau_{VK}$ depending directly on total delay $\tau_{VK}$ of the delay chain. In this case, instead of a square-wave pulse generator 1001 (which is no longer used because of self-oscillations), a start-stop switch may be introduced, which switches feedback signal lines 1012, 1013 (on/off).

In this implementation of the interconnectable delay matrix, two binary counters 1009, 1010 take the place of the delay comparator. The input of the first counter 1009 is connected to the first ring oscillator, and the input of the second counter 1010 is connected to the second ring oscillator. During a defined time interval, these two counters 1009, 1010 count the individual pulses of the ring oscillators. The two counter readings are then compared by numeric comparator 1011, at whose output the generated random bit $\beta_{ij}$ is then applied. If the counter reading of the first counter is higher, a value of 1 is allocated to the random bit; otherwise 0 is allocated.

By counting the pulses of the ring oscillators over a lengthy period of time, the two delay chains are run through several times, so that the difference in the total delays of the delay chains is added up again and again. Thus, as was the case previously in the expansion of a single delay element to form a delay chain, the extraction error probability, caused by measurement disturbances, is further reduced as much as desired, the longer the oscillation pulses are counted. This implementation is therefore particularly reliable.

In order for the feedback delay chains to actually oscillate, two prerequisites must be met:

First, the number of inverters in a delay chain must be uneven, and second, two separate ring oscillators must be formed by the feedback. In no case should a single ring oscillator of double length be formed. This would occur only in the event K=2, if the delay chains were crossed in an uneven number of double commutation circuits. Fulfillment of the first prerequisite does not require any additional measures if width L of delay matrix $M_{L \times K}$ is uneven. If L is even, an additional inverter 1004, 1005 is placed downstream from the downstream double multiplexers, upstream from each of the two feedbacks, so that the total number of inverters in one ring oscillator is uneven (see FIG. 10).

To fulfill the second prerequisite (for K=2), it is necessary to recognize when the delay chains are crossed in an uneven number $\chi$ of double commutation circuits (see FIG. 12b for crossings) in order to perform a further crossing (by a parity check circuit) within the upstream double demultiplexer in this case. If $\chi$ is already even, there must not be any additional crossing. Two separate ring oscillators are always formed when K>2, so that in this case the second prerequisite is always met.

Figure 11:
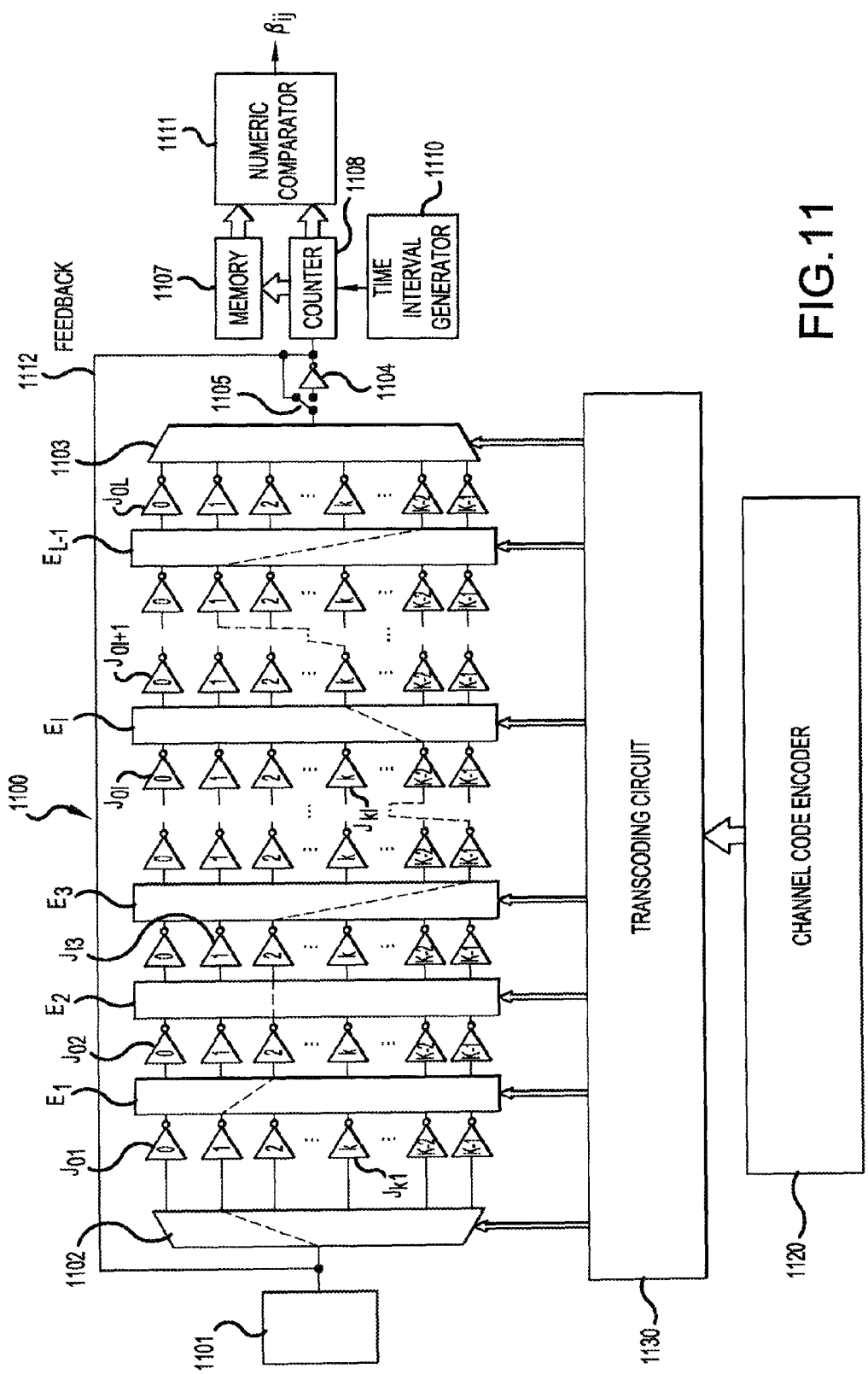
FIG. 11 shows a circuit configuration according to a third specific embodiment of the present invention.

FIG. 11 illustrates another particularly advantageous specific embodiment of the present invention.

FIG. 11 shows a square-wave pulse generator 1101 having one signal output, a multiplexer 1102 having one signal input and K signal outputs as well as one control input, indicated by a double arrow, K×L inverters $J_{kl}$ as delay elements, inverters $J_{kl}$ each having one signal input and one signal output, L−1 single commutation circuits $E_1, E_2, \ldots, E_{L-1}$, each having K signal inputs and K signal outputs as well as one control input indicated by an arrow, a single demultiplexer 1103 having K signal inputs and one signal output as well as one control input indicated by an arrow, an inverter 1104, a switch 1106, a memory module 1107 having one signal input and one signal output, a counter 1108 having one signal input, one control input and two signal outputs, a time interval generator 1110 having one signal output and a numeric comparator 1111 having two signal inputs and one signal output as well as a feedback signal line 1112.

Selection codes applied to the control inputs predefine which connection is established between signal inputs and signal outputs of single multiplexer 1102, double commutation circuits $E_1, E_2, \ldots, E_{L-1}$ and single demultiplexer 1103. This connection is shown with dashed lines in FIG. 11 as an example.

The following are in signal communication with one another:

the input of single multiplexer 1102 with exactly one output of single multiplexer 1102, the input being connectable to each output, the $k^{th}$ output of single multiplexer 1102 to the input of delay element $J_{kl}$, the output of delay element $J_{kl}$ for 1<L to the $k^{th}$ input of single commutation circuit $E_1$ and for 1=L to the $k^{th}$ input of single demultiplexer 1103, each input of single commutation circuit $E_1$ with exactly one output of the same double commutation circuit $E_1$, each input being connected to one other output, and each input being connectable to each output as a function of the setting of double commutation circuit $E_1$, the output of single demultiplexer 1103 with the input of counter 1108 via switch 1106 if L is uneven, after inversion by inverter 1104 or without inversion when switch 1106 is closed, and if L is even and uneven, with the input of single multiplexer 1102 with feedback via signal line 1112, the signal output of time interval generator 1110 with the control input of counter 1108, the signal outputs of counter 1108 and of memory module 1107 with the signal inputs of numeric comparator 1011.

In addition, FIG. 11 shows a channel code encoder 1120 for a channel code whose output signal functions as the input signal for a transcoding circuit (transcoder) 1130. The transcoding circuit generates a control signal, which is applied to the control inputs of single multiplexer 1102, single commutation circuits $E_1, E_2, \ldots, E_{L-1}$ and single demultiplexer 1103. Details about channel code encoder 1120 for a channel code and the channel code itself as well as transcoding circuit 1130 are described further below.

To generate a certain bit of the individual IC key, a code word of the channel code corresponding to this bit is initially provided by channel code encoder 1120 for a channel code and is converted by transcoding circuit 1130 into a corresponding control signal. This control signal is applied to the control inputs of single multiplexer 1102, single commutation circuits $E_1, E_2, \ldots, E_{L-1}$ and single demultiplexer 1103 to form one after the other the two chains of delay elements to be compared with one another, the comparison yielding the desired bit of the individual IC key. Time interval generator 1110 is started next, and a square-wave signal is generated and applied to the signal input of single multiplexer 1012 and then the set chain of delay elements is run through repeatedly (because of feedback signal line 1112), the counter 1108 allocated to the chain being incremented by one at the end of each run-through. The distribution of delay times of the individual delay elements yields, within the time interval predefined by time interval generator 1110, a different counter reading of counter 1108 because of the different transit time of the signal generated through the corresponding chain of delay elements, depending on the chain just set. If the predefined time interval has elapsed, time interval generator 1110 delivers a first control signal to counter 1108, which causes the output of the counter reading to memory module 1107 and causes the subsequent resetting of counter 1108. The control signal for the second chain of delay elements to be compared with the first chain is next applied to the control inputs of single multiplexer 1102, of single commutation circuits $E_1, \ldots, E_{L-1}$ and of single demultiplexer 1103; the time interval generator 1110 is started again (generating a time interval, which is the same as that for the first chain) and a signal is applied to the input of single multiplexer 1102, this signal passing through the second delay chain cyclically and the status of counter 1108 being incremented by one in each passage. After the intended time interval has elapsed, time interval generator 1110 delivers a second control signal, which causes the readout of counter 1108 and of memory module 1107 by numeric comparator 1111. Numeric comparator 1111 then determines the corresponding bit of the individual IC key from the difference in counter readings.

If L is uneven (or also if L is even, if inverter 1104 is additionally used), a self-oscillating ring oscillator is formed, having an oscillation frequency $f_{RO}=\frac{1}{2}\tau_{VK}$, which depends directly on total delay $\tau_{VK}$ of the delay chain. In this case, instead of a square-wave pulse generator 1101 (which is no longer used because of the self-oscillation), a start-stop switch may be introduced, switching the feedback signal line 1112 (on/off).

Additional bits of the individual IC key are then obtained by other code words.

According to this specific embodiment, there is thus only one ring oscillator, and the transit times of chains of delay elements to be compared are determined sequentially instead of in parallel. Experiments have shown that a synchronization of frequencies which approximate one another may occur with simultaneous oscillation of both ring oscillators due to the occurrence of cross-coupling effects. To prevent this, with the specific embodiment having ring oscillators and pulse counters just described above with reference to FIG. 11, it is also possible to perform the counting of the pulses of the two ring oscillators sequentially instead of simultaneously. In that case, the ring oscillator whose pulses are not being counted is switched off so that the cross-coupling effects cannot occur.

An additional advantage of this variant is the possibility of extensive simplification of the circuit because single commutation circuits instead of double commutation circuits are sufficient to create a single ring oscillator. The single commutation circuits have a design similar to that shown in FIG. 7b but only with one multiplexer-demultiplexer interconnection 742-744 (multiplexer-demultiplexer interconnection 743-745 and the respective connections are omitted). However, one memory 1107, which is connected to the first input of numeric comparator 1111, is then required. The counter reading is stored in this memory after the first count until the two counter readings may be compared with one another after the second count, as illustrated in FIG. 11.

Another possibility of avoiding synchronization of the ring oscillators with simultaneous oscillation is to lengthen one of the two feedback delay chains by additional delay elements, for example, through a small even number of inverters (e.g., two) upstream from only one of the two feedbacks. This results in desynchronization of the ring oscillators. The resulting imbalance in the counter values must be compensated in the analysis by the numeric comparator.

In one embodiment of the present invention, which is particularly simple in terms of circuit technology, K=2. In this case, it is sufficient to use only two (2:1) multiplexers instead of the double commutation circuits. This is possible because the demultiplexers of the double commutation circuits no longer need reroute the signals to two of K>2 possible outputs, as in the general case, but instead always to the same two outputs, which correspond to those of the two (2:1) multiplexers. Since only the information about whether the two lines are crossed or not (1 or 0) need be encoded for this purpose, the triggering of this binary commutation circuit may then be binary, as shown in FIG. 12.

Figure 12A:
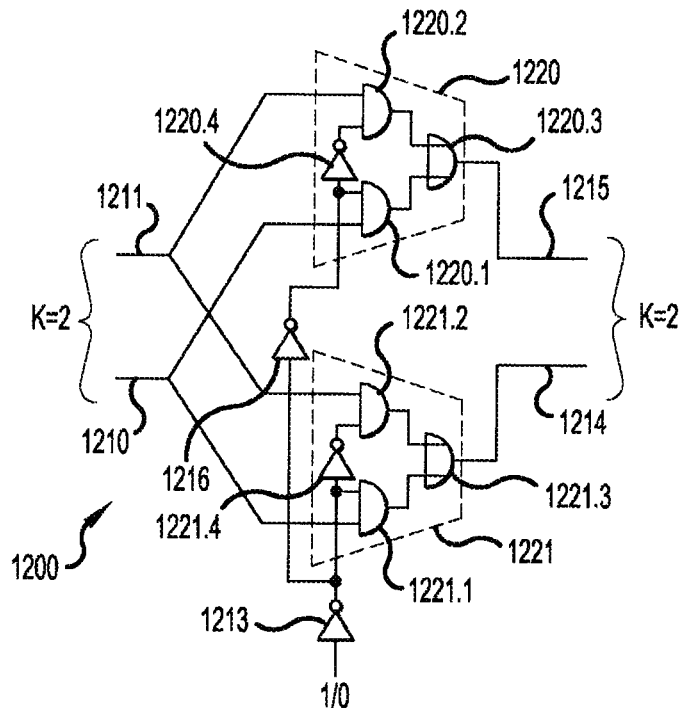
FIG. 12a shows the design of a binary commutation circuit 1200 in detail.

FIG. 12a illustrates the design of a binary commutation circuit 1200 in detail. It shows two signal lines 1210, 1211 for input signals, two demultiplexers 1220, 1221, each having two signal inputs, one control input and one signal output, a signal line 1212 for control signals, which are sent from the output of an inverter 1213 to the control input of demultiplexers 1220 and 1221, and two signal lines 1214, 1215 for output signals.

Demultiplexer 1220 has two AND circuits 1220.1, 1220.2 having two signal inputs and one signal output and one OR circuit 1220.4 having two signal inputs and one signal output as well as one inverter 1220.4. In a completely similar manner, demultiplexer 1221 has two AND circuits 1221.1, 1221.2 having two signal inputs and one signal output and an OR circuit 1221.3 having two signal inputs and one signal output as well as an inverter 1221.4.

The following are in signal communication with one another:

- signal line 1210 and the first signal input of AND circuit 1220.1 of demultiplexer 1220,
- signal line 1211 and a signal input of AND circuit 1220.2 of demultiplexer 1220,
- signal line 1212 and the second signal input of AND circuit 1220.1 of demultiplexer 1220,
- signal line 1212 and the second signal input of AND circuit 1220.2 of demultiplexer 1220 via inverter 1220.4,
- the signal outputs of AND circuits 1220.1 and 1220.2 with both signal inputs of OR circuit 1220.3,
- the signal output of OR circuit 1220.3 with signal line 1215,
- signal line 1220 and the first signal input of AND circuit 1221.1 of demultiplexer 1221,
- signal line 1211 and one signal input of AND circuit 1221.2 of demultiplexer 1221,
- signal line 1212 and the second signal input of AND circuit 1221.1 of demultiplexer 1221,
- signal line 1212 and the second signal input of AND circuit 1221.2 of demultiplexer 1221 via inverter 1221.4,
- the signal outputs of AND circuits 1221.1 and 1221.2 to the two signal inputs of OR circuit 1221.3, and
- the signal output of OR circuit 1221.3 to signal line 1214.

This interconnection ensures that in the case of a logic 1 as the control signal, the signal applied to signal line 1211 will be forwarded to signal line 1214 after passing through binary commutation circuit 1200, and the signal applied to signal line 1210 will be forwarded to signal line 1215 after passing through binary commutation circuit 1200, so that a crossing signal connection is established. In the case of a logic 0 as the control signal, however, the signal applied to signal line 1211 is forwarded to signal line 1215 after passing through binary commutation circuit 1200, and the signal applied to signal line 1210 is forwarded to signal line 1214 after passing through binary commutation circuit 1200, so that a noncrossing signal connection is established.

Figure 12B:
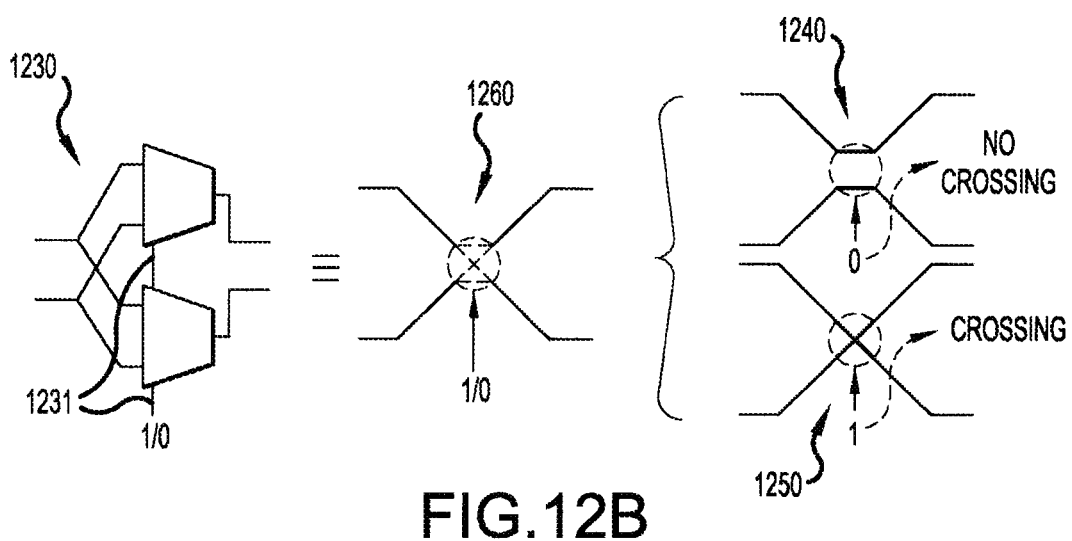

FIG. 12b provides a definition for the abbreviated notation for the circuit according to FIG. 12a, which is used further below in FIG. 13. FIG. 12b shows in its left column a schematic diagram of a binary commutation circuit 1230, which differs from the binary commutation circuit shown in FIG. 12a only with regard to the degree of detail shown. As described in detail in the preceding paragraph, this circuit corresponds to noncrossing signal connection 1240 and crossing signal connection 1250, depending on an applied control signal 1231. This is indicated by notation 1260 shown in the middle column of FIG. 12b.

Figure 13A:
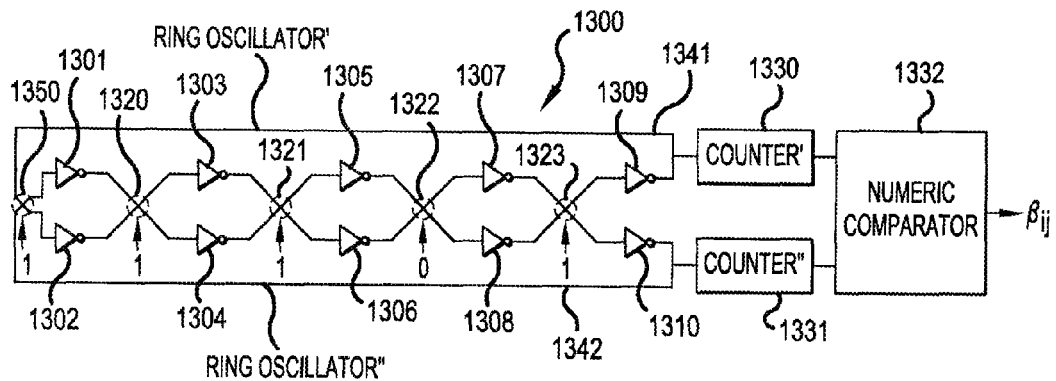
FIG. 13a shows a concrete embodiment of the present invention having a connectable delay matrix for K=2 and L=5 according to the general principle shown in FIG. 10.

FIG. 13a shows a concrete embodiment 1300 of the invention having an interconnectable delay matrix for K=2 and L=5, following the general principle illustrated in FIG. 10. Not shown here are the square-wave generator, code generator and transcoder. This shows inverters 1301, ..., 1310, each having one signal input and one signal output, functioning as delay elements for binary commutation circuits 1320, 1321, 1322, 1323, two counters 1330, 1331, each having one signal input and one signal output, a numeric comparator 1332 having two signal inputs, two feedback signal lines 1341, 1342 and one additional binary commutation circuit 1350, which is controlled by a parity check circuit to prevent the feedback signal, which is fed back from a chain of delay elements, from being fed into the other chain of delay elements.

The following signal connections exist:

- the signal outputs of inverters 1301, 1302 with the signal inputs of inverters 1303, 1304 via binary commutation circuit 1320,
- the signal outputs of inverters 1303, 1304 with the signal inputs of inverters 1305, 1306 via binary commutation circuit 1321,
- the signal outputs of inverters 1305, 1306 with the signal inputs of inverters 1307, 1308 via binary commutation circuit 1322,
- the signal outputs of inverters 1307, 1308 with the signal inputs of inverters 1309, 1310 via binary commutation circuit 1323,
- the signal outputs of inverters 1309 and 1310 with the signal inputs of counters 1330 and 1331,
- the signal outputs of inverters 1309 and 1310 with the signal inputs of inverters 1301, 1302 via feedback signal lines 1341, 1342 and binary commutation circuit 1350,
- the signal outputs of counters 1330 and 1331 with the signal inputs of numeric comparator 1332.

FIG. 13a shows only the circuit for a certain applied code. In particular this does not show a code generator, a transcoder, a time interval generator or a square-wave generator, each of which is necessary per se, for triggering the corresponding feedback oscillators.

Figure 13B:
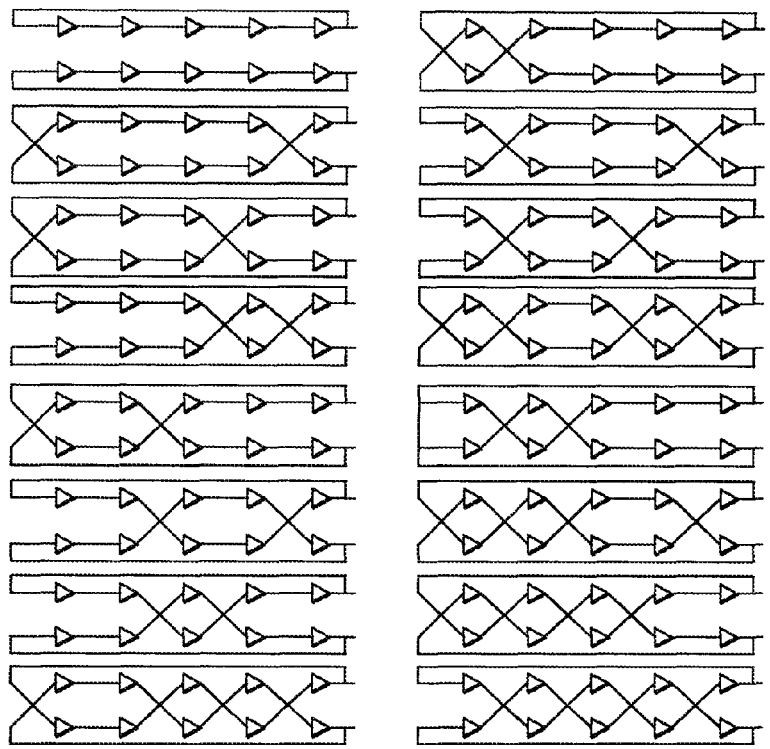

FIG. 13b illustrates all 16 pairs of delay chains, which may be formed using the configuration shown in FIG. 13a. It is apparent here in particular that it is possible to ensure that all circuit options and code words may be implemented without forming a single double-length ring oscillator only by providing a parity check circuit, which is necessary to control binary commutation circuit 1350.

The disadvantage of this implementation is that the strong Hamming distance between any two chain pairs is always equal to zero because in each column of $M_{2 \times L}$, only two delay elements are available for all four delay chains of the two chain pairs. Thus it always holds that $G_s$=L (see equation (1)). As a result, a correlation of individual bits of the individual IC key thus generated is unavoidable. Therefore, a channel code, which reduces the correlation as much as possible, i.e., at least maximizing the weak Hamming distance, must be found for the configuration of the chain pairs. This is optimally implemented when as many bits as possible change from one code word to the next because a bit change in the channel code represents a transposition of a delay pair and therefore $G_w$ is reduced (see equation (2)).

Figures 14A, 14B, 14C:
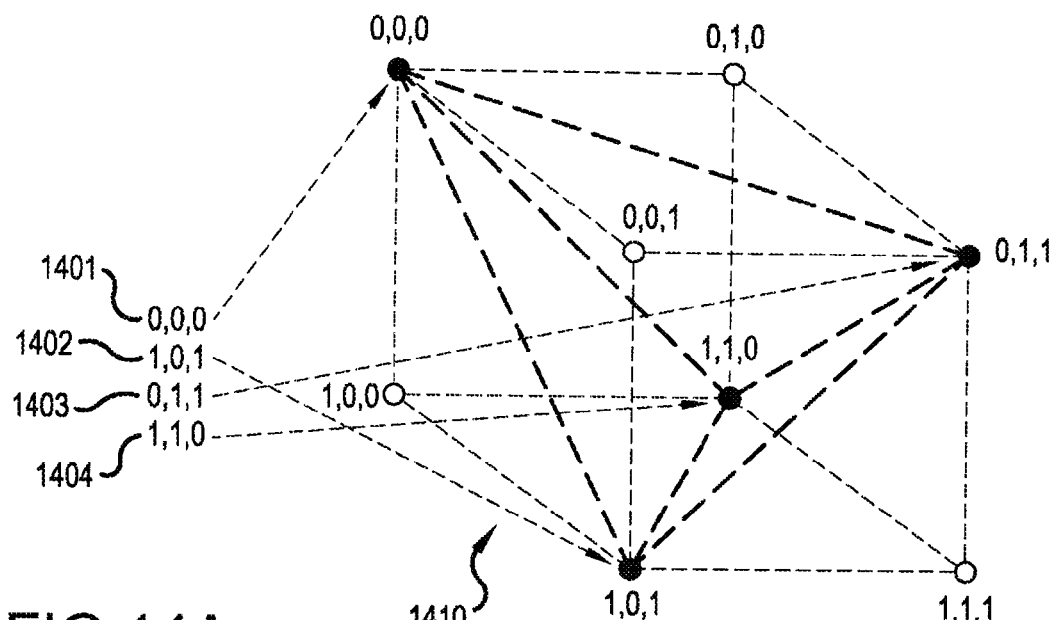
FIG. 14a shows a simplex code for the case when K=2, l=2, L=3 (=$2^1$−1)
FIG. 14b shows a graphic illustration of a simplex code for the case when K=2, l=2, L=3 (=$2^1$−1)
FIG. 14c shows a simplex code for the case when K=2, l=3, L=7 (=$2^1$−1)

Therefore, in the case when K=2, binary simplex codes (L, N, $d_{Hm}$)$_2$ are used as linear channel codes. Of all block codes, they have the greatest possible minimal Hamming distance $d_{HM}$=N/2 and thus the most bit changes between two code words. The simplex codes exist only for certain bit lengths L=($2^n$−1) and have N=$2^n$ (n=2, 3, ... ) different code words. Thus for many formats of the delay matrix and certain values of length N of the individual IC key, the direct use of simplex codes is impossible unless they are modified (shortened or converted to dots) accordingly or only a subset of code words is used. FIG. 14a shows a binary code for n=2, i.e., for the bit length of 3, consisting of four code words 1401, 1402, 1403, 1404.

FIG. 14b shows a graphic illustration 1410 of the simplex code from FIG. 14a in a three-dimensional space and the corresponding Hamming cube in which the code words span a tetrahedron. The simplex codes in this case thus describe how four points in a cube of edge length 1 may each be arranged at maximal mutual distance (Euclidean and Hamming).

FIG. 14c shows a corresponding simplex code for n=3, i.e., having a bit length of 7 bits. It has eight code words 1411, 1412, 1413, 1414, 1415, 1416, 1417, and 1418. A simple graphic illustration is no longer possible in this case but the analogy with the three-dimensional illustration remains: eight code words determine the corners of a seven-dimensional equivalent of a tetrahedron—of a simplex [code], which is written in a seven-dimensional Hamming cube.

Figure 15:
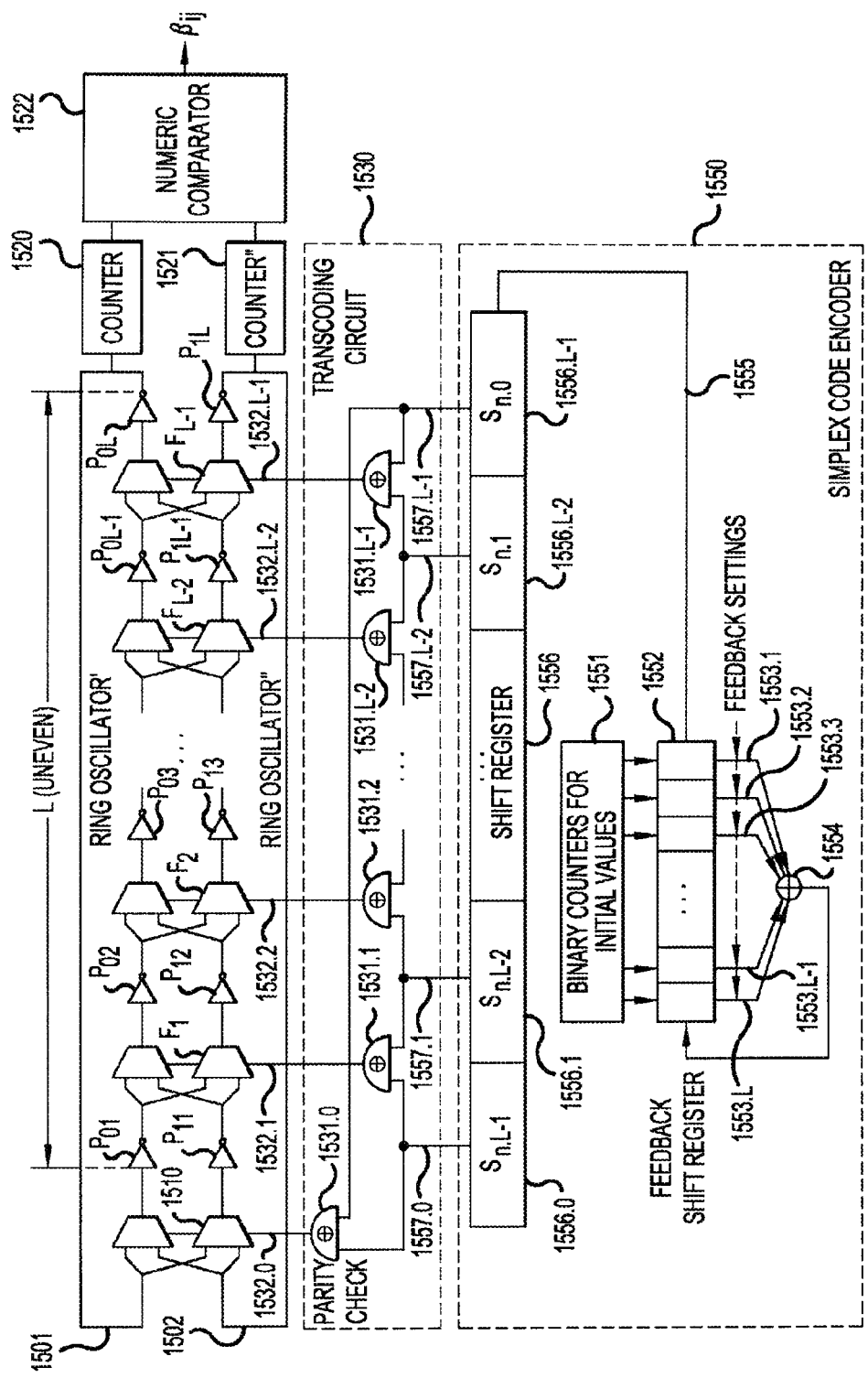
FIG. 15 shows an alternative specific embodiment of the present invention for the case when K=2.

FIG. 15 shows a specific embodiment of the invention for the case when K=2. As is known from encoding theory, the code words of a simplex code may be generated easily by a feedback shift register of length L, whose feedbacks are defined by using a primitive polynomial.

In order for the transposition in the delay elements defined by the simplex code word to be implementable, it must be transcoded by a transcoder of the channel code for triggering the binary commutation circuits, as already defined above for the general case (K>2). In the case when K=2, the transcoder of the channel code uses the XOR linkage of two successive bits of the code word to trigger the binary commutation circuit situated between the delay pairs affected by these bits, independently of the channel code selected. To prevent a single ring oscillator of double length from being formed, the transcoder controls the multiplexers upstream from the delay matrix through the XOR linkage of the first and last bits of the channel code word, as illustrated in FIG. 15. A parity check is already performed implicitly by such a transcoding.

FIG. 15 shows in detail a 2×L matrix of inverters $P_{kl}$, where k=0, 1; l=1, ..., L having L uneven, L−1 binary commutation circuits $F_1, \ldots, F_{L-1}$; two feedback signal lines 1501, 1502, another binary commutation circuit 1510, two counters 1520, 1521 each having one signal input and one signal output, one numeric comparator 1522, a transcoding circuit 1530 and a simplex code encoder 1550.

The simplex code encoder 1550 has a binary counter 1551 for initial values having L bits, the contents of which may be written into a shift register 1552 of L bit width. Shift register 1552 has feedback via switches 1553.1, ..., 1553.L and an adding circuit 1554 and is also connected to a shift register 1556 of L-bit width and to register cells 1556.0, ..., 1556.L-1 via a signal line 1555. To change a code, the value contained in shift register 1552 is shifted into shift register 1556 via signal line 1555, and at the same time an update of the value contained in shift register 1552 is initiated using a value newly calculated by adding circuit 1554 as a function of the feedback settings, i.e., the position of switches 1553.1, ..., 1553.L.

Cells 1556.0, ..., 1556.L-1 function as outputs of simplex code encoder 1550. The values stored therein are transferred to transcoding circuit 1530 via signal lines 1557.0, ..., 1557.L-1.

The transcoding circuit in this case consists simply of L XOR circuits 1531.0, ..., 1531.L-1, each having two signal inputs and each having one signal output. Signals of signal lines 1557.n-1 and 1557.n are applied to the inputs of XOR circuit 1531.n for n=1, ..., L−1, and signals of signal lines 1557.L=1 and 1557.0 are applied to the inputs of XOR circuit 1557.0.

The output of XOR circuit 1531.n is applied to the control input of binary commutation circuit $F_n$ via a signal line 1532.n for each of n=1, ..., L. This signal determines the signal passage through the commutation circuit as explained above in detail with reference to FIG. 12. Signal line 1532.0 supplies the control signal for commutation circuit 1510.

Furthermore, the following signal connections exist:
for l=1, L−1, the signal outputs of inverters P 01, P11 with the signal inputs of inverters $P_{01+1}$, $P_{11+1}$ via binary commutation circuit $E_1$,
the signal outputs of inverters $P_{0L}$ and $P_{1L}$ with the signal inputs of counters 1520 and 1521,
the signal outputs of inverts $P_{0L}$ and $P_{1L}$ with the signal inputs of inverters $P_{01}$, $P_{11}$ via feedback signal lines 1501, 1502 and parity check circuit 1510,
the signal outputs of counters 1520 and/or 1521 with the signal inputs of numeric comparator 1522.

FIG. 15 in particular does not show a time interval generator, which is necessary per se, and a square-wave generator for triggering the corresponding feedback oscillators.

The device shown in FIG. 15 functions as follows: based on an initial value of simplex code encoder 1550 stored in the binary counter for initial values 1551, a first code word is made available in shift register 1556 and is translated into a configuration of binary commutation circuits $F_1$ through $F_{L-1}$ and 1510 by transcoding circuit 1530. Therefore, two independent ring oscillators are formed. The time interval generator (not shown) is started, resulting in a signal, which is generated by a square-wave signal generator (not shown), for example, being fed into the independent ring oscillators. Depending on the individual transit times of the signal through inverters $P_{kl}$, each of which contributes to a ring oscillator, the signal requires different amounts of time to pass through the differently formed oscillators. With each passage through a ring oscillator, respective counter 1520 and 1521 is incremented by 1.

After the time interval has elapsed, the time interval generator outputs a clock signal, which induces the readout of counters 1520, 1521 by a numeric comparator 1522 on the one hand and therefore generates one bit of the individual IC key and on the other hand triggers a calculation of a new code word by feedback of shift register 1520 and by supplying the next code word in shift register 1556. This code word corresponds to another interconnection of the inverters, functioning as delay elements with which the procedure described above for extracting the next bit of the individual IC key is performed again.

References

[1] Kai Schramm, Kerstin Lemke, Christof Pear: "Embedded Cryptography: Side Channel Attacks", in Kerstin Lemke, Christof Paar Marko Wolf (Eds.): "Embedded Security in Cars", Springer-Verlag, ISBN 3-540-28384-6, pp. 187-206, 2006.

[2] Kerstin Lemke: "Embedded Security: Physical Protection against Tampering Attacks", in Kerstin Lemke, Christof Paar, Marko Wolf (Eds.): "Embedded Security in Cars", Springer-Verlag, ISBN 3-540-28384-6, pp. 207-220, 2006.

[3] Stefan Mangard, Elisabeth Oswald, Thomas Popp: "Power Analysis Attacks—Revealing the Secrets of Smart Cards", Springer, ISBN 0-387-30857-1, 2007, Chapt. 1, pp. 1-13.

[4] Joint Interpretation Library: "Integrated Circuit Hardware Evaluation Methodology—Vulnerability Assessment," version 1.3, IT Security Criteria and Evaluation according to ITSEC, http://www.bsi.de/zertifiz/itkrit/itsec.htm, April 2000.

[5] Sean W. Smith, Steve Weingart: "Building a High-Performance, Programmable Secure Coprocessor", Technical Report, IBM T.J. Watson Research Center, P.O Box. Yorktown Heights N.Y. 10598, USA, www.research.ibm.com/secure_systems_department/projects/scop/p apers/arch.pdf, Revision of Oct. 16, 1998.

[6] Dejan E. Lazic, Vojin Senk: "A Direct Geometrical Method for Bounding the Error Exponent for any Specific Family of Channel Codes—Part I: Cutoff Rate Lower Bound for Block Codes", *IEEE Transactions on Information Theory*, Vol. 38, No. 5, pp. 1548-1559, September 1992.

[7] Stephen Wicker, Vijary Bhargava: "Reed-Solomon Codes and Their Applications", IEEE Press, ISBN 0-7803-1025-X, 1994, Chapt. 1, pp. 1-16, Chapt. 5, pp. 60-105.

[8] F. J. MacWilliams and N. J. A. Sloane: "The theory of Error-Correcting Codes", North-Holland, Amsterdam, ISBN 0-444-85193-3, 1977, Chapter 1, pp. 1-34, Chapter 2, pp. 38-78, Chapter 10, pp. 4-315.

[9] Solomon W. Golomb, Guang Gong: "Signal Design for Good Correlation: For Wireless Communication, Cryptography, and Radar", Cambridge University Press, ISBN 0-5218-2104-5, 2005, Chapt. 4, pp. 81-114.

What is claimed is:

1. A circuit for generating a true, circuit-specific, time-invariant, binary random number, comprising:
a matrix of K·L delay elements, which are interconnectable to form chains of delay elements of length L via L−1 commutation circuits, each chain including L delay elements and the L−1 commutation circuits each provided between two adjacent delay elements among the L delay elements, each commutation circuit having K input signals and K output signals thereby each commutation circuit receives a predetermined number of the K inputs from a previous stage of the chains and provides the predetermined number of the K outputs to a subsequent stage of the chains,
a demultiplexer connected upstream of the matrix, and the demultiplexer outputting K output signals directly chains of the delay elements;
a multiplexer connected downstream of the matrix, and inputting K input signals directly from the last stage of the chains of the delay elements;
a comparator connected downstream of the multiplexer;
a transcoder that transmits a control signal to each of the demultiplexer, the multiplexer and the L−1 commutation circuits, the setting of the L−1 commutation circuits, the demultiplexer and the multiplexer being preselectable by the control signal, and
a channel code encoder that generates code words of the channel code and that provides the code words of the channel code to the transcoder,
wherein the transcoder transcodes the code words of the channel code to the control signal of the L−1 commutation circuits, the demultiplexer and the multiplexer, such that the demultiplexer, the L−1 commutation circuits and the multiplexer form the predetermined number of chains of delay elements in accordance with the channel code.

2. The circuit as recited in claim 1, wherein the delay elements comprise inverters.

3. The circuit as recited in claim 2, wherein the first chain of the L delay elements is fed back to form a first ring oscillator at its input, and the output of the second chain of the L delay elements is fed back to form a second ring oscillator at its input, either the chain length L being uneven or the chain length L being even, and the feedback taking place via an additional inverter.

4. The circuit as recited in claim 3, wherein the comparator comprises a numeric comparator, a first counter and a second counter, the first counter being in signal connection with the first ring oscillator and the first input of the numeric comparator, and the second counter being in signal connection with the second ring oscillator and the second input of the numeric comparator.

5. The circuit as recited in claim 1, wherein a generator for initial values of the channel encoding encoder is provided.

6. The circuit as recited in claim 5, wherein the generator for initial values of the channel code encoder is a counter.

7. The circuit as recited in claim 5, wherein the generator for initial values of the channel code encoder is a lookup table.

8. The circuit as recited in claim 1, wherein K>2, and the channel code encoder generates the code words of a Reed-Solomon code.

9. The circuit as recited in claim 1, wherein K=2, and for a natural number l>0, the channel code encoder has a feedback shift register having $L = 2^{l-1}$ shifts and L+1 initial values, whose feedbacks are determined by a primitive polynomial.

10. The circuit as recited in claim 1, wherein the channel code encoder is designed as a lookup table or the channel code encoder and the transcoder are designed as a lookup table.

11. A circuit for generating a true, circuit-specific, time-invariant, binary random number comprising:
a matrix of K·L delay elements, which are interconnectable to form chains of delay elements of length L via L−1 commutation circuits,
a demultiplexer connected upstream from the matrix,
a multiplexer connected downstream from the matrix, and
a comparator,
the setting of the commutation circuits, the demultiplexer and the multiplexer being preselectable by a control signal,
wherein the circuit has a channel code encoder, with which code words of a channel code are generable, and a transcoder, with which code words of the channel code are transcodable to the control signal of the L−1 commutation circuits, the demultiplexer and the multiplexer,
wherein the delay elements comprise inverters,
wherein the first chain of the L delay elements is fed back to form a first ring oscillator at its input, and the output of the second chain of the L delay elements is fed back to form a second ring oscillator at its input, either the chain length L being uneven or the chain length L being even, and the feedback taking place via an additional inverter, and
wherein at least one of the chains has at its beginning or end at least one additional delay element not belonging to the matrix of K·L delay elements, this delay element being connected directly to the delay elements of the chain adjacent to it and not via a commutation circuit, and the two chains including different numbers of delay elements.

12. A method for generating a true, circuit-specific, time-invariant random number via a matrix of K·L delay elements, which are interconnectable to form chains of delay elements of length L via L−1 single or double commutation circuits, a single or double demultiplexer connected upstream of the matrix, a single or double multiplexer connected downstream of the matrix, and a transit time comparator or numeric comparator, a transcoder that transmits a control signal to each of the demultiplexer, the multiplexer and the L−1 commutation circuits, and a channel code encoder that generates code words of the channel code and that provides the code words of the channel code to the transcoder, each chain including L delay elements and the L−1 single or double commutation circuits each provided between two adjacent delay elements among the L delay elements, each commutation circuit having K input signals and K output signals, the single or double demultiplexer outputting K output signals directly to a first stage of the chains of the delay elements, the single or double multiplexer inputting K input signals directly from the last stage of the chains of the delay elements, the method comprising:

a) generating a code word of the channel code by the channel code encoder,
b) transcoding the code word of the channel code to a selection code and setting a setting of the L−1 single or double commutation circuits, the single or double demultiplexer and the single or double multiplexer corresponding to the code words of the selection code by the transcoder,
c) generating the chains of the L delay elements, such that the single or double demulttlexer the L−1 single or double commutation circuits and the single or double multiplexer form a predetermined number of chains of L delay elements in accordance with the channel code, thereby each commutation circuit receives the predetermined number of the K inputs from a previous stage of the chains ands provides the predetermined number of the K outputs to a subsequent stage of the chains, and
d) performing paired comparison of quantities, determined by the delay times of the chains of the L delay elements defined by the setting of the L−1 commutation circuits corresponding to the code word of the channel code, via a numeric comparator or a delay comparator for generating one bit of the true, circuit-specific, time-invariant random number.

13. The method as recited in claim 12, wherein the quantities, which are compared in pairs, determined by the delay times of the chains of the L delay elements defined by the setting of the L−1 single or double commutation circuits are generated by operating the chains as a ring oscillator over a predefined number of oscillations.

14. The method as recited in claim 13, wherein the first chain of the L delay elements and the second chain of the L delay elements are operated individually in succession as a ring oscillator.

15. The method as recited in claim 12, wherein K=2, and a Reed-Solomon code is used as the channel code.

16. The method as recited in claim 12, wherein K=2, and a simplex code is used as the channel code.

17. The method as recited in claim 16, wherein the code words of the channel code are generated by a feedback shift register, in which the feedbacks are determined by a primitive polynomial.

18. A method for generating a true circuit-specific, time-invariant random number via a matrix of K·L delay elements, L−1 single or double commutation circuits, a single or double demultiplexer connected upstream from the matrix, a single or double multiplexer connected downstream from the matrix, and a transit time comparator or numeric comparator comprising:

a) generating a code word of a channel code,
b) transcoding a code word of a channel code to a selection code,
c) generating chains of the L delay elements by setting a setting of the L−1 single or double commutation circuits corresponding to the code words of the selection code, of the single or double demultiplexer and the single or double multiplexer, and,
d) performing paired comparison of quantities, determined by the delay times of two chains of the L delay elements defined by the setting of the L−1 commutation circuits corresponding to the code word of the channel code, via a numeric comparator or a delay comparator for generating one bit of the true circuit-specific, time-invariant random number,
wherein the quantities, which are compared in pairs, determined by the delay times of the chains of the L delay elements defined by the setting of the L−1 single or double commutation circuits are generated by operating the chains as a ring oscillator over a predefined number of oscillations,
wherein the first chain of the L delay elements and the second chain of the L delay elements are operated simultaneously as a ring oscillator,
at least one additional delay element not belonging to the matrix of K·L delay elements is provided at the beginning or end of one of the first and second chains of the L delay elements, and
a defined time offset, which increases through the at least one added additional delay elements is generated between the chains.

19. The method as recited in claim 18, wherein the quantities generated for comparison by operation of the chains as a ring oscillator are corrected by the defined time offset before the comparison.

20. The method as recited in claim 16, wherein K=2, and the transcoding is performed according to the XOR rule.

21. The method as recited in claim 20, wherein the transcoding includes a parity check.

* * * * *